United States Patent
Ma et al.

(10) Patent No.: US 12,182,810 B2
(45) Date of Patent: *Dec. 31, 2024

(54) DETAILING SECURE SERVICE PROVIDER TRANSACTIONS

(71) Applicant: Apple Inc., Cupertino, CA (US)

(72) Inventors: Chunlai Ma, Dublin, CA (US); Eric J. Gray, Sunnyvale, CA (US); Fei Gao, San Francisco, CA (US); David L. Neumann, Lake Oswego, OR (US); Xinyu Zhao, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,114

(22) Filed: Jun. 23, 2022

(65) Prior Publication Data

US 2022/0327537 A1 Oct. 13, 2022

Related U.S. Application Data

(63) Continuation of application No. 16/142,813, filed on Sep. 26, 2018, now Pat. No. 11,392,945.
(Continued)

(51) Int. Cl.
G06Q 20/40 (2012.01)
G06Q 20/00 (2012.01)
(Continued)

(52) U.S. Cl.
CPC ........... *G06Q 20/401* (2013.01); *G06Q 20/00* (2013.01); *G06Q 20/047* (2020.05); *G06Q 20/322* (2013.01); *G06Q 20/3821* (2013.01)

(58) Field of Classification Search
CPC .... G06Q 20/401; G06Q 20/00; G06Q 20/047; G06Q 20/322; G06Q 20/3821
See application file for complete search history.

(56) References Cited

U.S. PATENT DOCUMENTS

| | | |
|---|---|---|
| 5,317,503 A | 5/1994 | Inoue |
| 6,115,458 A | 9/2000 | Taskett |

(Continued)

OTHER PUBLICATIONS

U.S. Appl. No. 16/142,813, Final Office Action, Mailed On Jul. 14, 2020, 24 pages.
(Continued)

*Primary Examiner* — Christine M Behncke
*Assistant Examiner* — Henry H Jung
(74) *Attorney, Agent, or Firm* — Kilpatrick Townsend & Stockton LLP

(57) ABSTRACT

A customer interfacing with a credential manager may be enabled to request and obtain securely from the credential manager additional details related to a service transaction previously effected between the customer and a service provider using a customer transaction credential managed by the credential manager. To obtain such a detailed customer receipt for presentation to a customer, the credential manager may provide an authenticatable customer receipt request to the service provider that may include certain information indicative of an active session between the credential manager and an authenticated customer and/or certain information indicative of a trusted relationship between the credential manager and service provider. When a request is authenticated, the service provider may provide a detailed customer receipt to the credential manager in a format that may be presented to the customer but that may not be used by the credential manager to easily access details conveyed by the receipt.

20 Claims, 9 Drawing Sheets

Related U.S. Application Data

(60) Provisional application No. 62/635,171, filed on Feb. 26, 2018, provisional application No. 62/565,656, filed on Sep. 29, 2017.

(51) Int. Cl.
  *G06Q 20/04* (2012.01)
  *G06Q 20/32* (2012.01)
  *G06Q 20/38* (2012.01)

(56) References Cited

U.S. PATENT DOCUMENTS

| | | | |
|---|---|---|---|
| 7,209,897 | B2 | 4/2007 | Ghiloni et al. |
| 8,650,124 | B2 | 2/2014 | Singh |
| 9,230,066 | B1 | 1/2016 | Bailey et al. |
| 9,324,098 | B1* | 4/2016 | Agrawal ................ G06Q 30/04 |
| 9,659,312 | B1 | 5/2017 | Ellis et al. |
| 2004/0064373 | A1 | 4/2004 | Shannon |
| 2010/0198652 | A1 | 8/2010 | Spanton, Jr. et al. |
| 2012/0066010 | A1 | 3/2012 | Williams et al. |
| 2012/0192255 | A1 | 7/2012 | Ganesan |
| 2012/0197742 | A1 | 8/2012 | Johnson |
| 2012/0320825 | A1 | 12/2012 | Yi et al. |
| 2014/0074675 | A1 | 3/2014 | Calman et al. |
| 2014/0258110 | A1 | 9/2014 | Davis et al. |
| 2015/0032526 | A1* | 1/2015 | Calman .............. G06Q 30/0224 |
| | | | 705/26.7 |
| 2015/0363889 | A1 | 12/2015 | Marian et al. |
| 2015/0371207 | A1 | 12/2015 | Cummins et al. |
| 2016/0162817 | A1 | 6/2016 | Grimaldi et al. |
| 2016/0260107 | A1 | 9/2016 | Seth et al. |
| 2016/0328803 | A1 | 11/2016 | Whitley et al. |
| 2016/0335613 | A1 | 11/2016 | Laracey |
| 2016/0350757 | A1 | 12/2016 | Bolling et al. |
| 2017/0004509 | A1 | 1/2017 | Mande et al. |
| 2017/0031963 | A1 | 2/2017 | Merz et al. |
| 2017/0201799 | A1 | 7/2017 | McDermott |
| 2017/0255793 | A1 | 9/2017 | Caldwell |

OTHER PUBLICATIONS

U.S. Appl. No. 16/142,813 , Non-Final Office Action, Mailed On Jun. 11, 2021, 23 pages.

U.S. Appl. No. 16/142,813 , Notice of Allowance, Mailed On Mar. 14, 2022, 8 pages.

Non-Final Office Action issued in U.S. Appl. No. 17/848,115, dated Oct. 27, 2023 in 34 pages.

Non-Final Office Action issued in U.S. Appl. No. 17/848,693, dated Dec. 21, 2023, 2023 in 33 pages.

* cited by examiner

100

DETAILING SECURE SERVICE PROVIDER TRANSACTIONS

CROSS-REFERENCE TO RELATED APPLICATION

This application is continuation of U.S. patent application Ser. No. 16/142,813, filed Sep. 26, 2018, which claims the benefit of prior filed U.S. Provisional Patent Application No. 62/565,656, filed Sep. 29, 2017, and of prior filed U.S. Provisional Patent Application No. 62/635,171, filed Feb. 26, 2018, each of which is hereby incorporated by reference herein in its entirety.

TECHNICAL FIELD

This disclosure relates to detailing secure service provider transactions and, more particularly, to securely providing details of transactions between a user and a service provider subsystem to a user electronic device via a credential manager subsystem.

BACKGROUND OF THE DISCLOSURE

A customer may conduct multiple service transactions with a service provider (e.g., multiple purchases of goods/services of an online media store) using a transaction credential managed by a credential manager (e.g., a payment instrument of a financial institution), and the service provider may aggregate the multiple service transactions into a single aggregated transaction before sending an authorization request for the aggregated transaction to the credential manager. Such an authorization request for an aggregated transaction may include no information about the individual transactions that have been aggregated but may instead only include limited information about the aggregated transaction (e.g., a total purchase amount for (e.g., sum of) all the underlying individual transactions of the aggregated transaction), such that, when the customer interfaces with the credential manager to review previous purchases made using the transaction credential, the credential manager may be unable to provide the customer with relevant details about the aggregated transaction, such as details about any underlying individual transactions of the aggregated transaction.

SUMMARY OF THE DISCLOSURE

This document describes systems, methods, and computer-readable media for detailing secure service provider transactions.

As an example, a method for managing transactions in a system including a service provider subsystem and a funding subsystem is provided that may include, at the service provider subsystem, facilitating a plurality of service transactions, wherein each service transaction of the plurality of service transactions includes service transaction details including a service transaction value amount and at least one service transaction descriptor, aggregating at least two service transactions of the plurality of service transactions into an aggregated transaction including an aggregated transaction identifier and an aggregated transaction value amount, communicating authorization data to the funding subsystem, wherein the authorization data is indicative of the aggregated transaction identifier and the aggregated transaction value amount, after the communicating, receiving from the funding subsystem a customer receipt viewing request including transaction request data, authenticating the customer receipt viewing request, when the customer receipt viewing request is authenticated, generating a customer receipt including receipt content indicative of the at least one service transaction descriptor of each one of the at least two service transactions of the aggregated transaction using the transaction request data of the customer receipt viewing request, and communicating the receipt content to the funding subsystem.

As another example, a method for managing transactions in a system including a service provider subsystem and a funding subsystem is provided that may include, at the service provider subsystem, facilitating a service transaction, wherein the service transaction includes service transaction details including a service transaction identifier and a service transaction value amount and a service transaction descriptor, communicating authorization data to the funding subsystem, wherein the authorization data is indicative of the service transaction identifier and the service transaction value amount, after the communicating, receiving from the funding subsystem a customer receipt request including the service transaction identifier, obtaining, using the service transaction identifier of the received customer receipt request, a customer receipt indicative of the service transaction descriptor, and communicating the customer receipt to the funding subsystem.

As yet another example, a method for managing transactions in a system including a service provider subsystem and a funding subsystem is provided that may include, at the funding subsystem, receiving from the service provider subsystem authorization data indicative of a service transaction identifier of a service transaction facilitated by the service provider subsystem and a service transaction value amount of the service transaction, communicating to the service provider subsystem a customer receipt request including the service transaction identifier indicated by the authorization data and authentication data indicative of an active session between the funding subsystem and an authenticated customer of the funding subsystem, after the communicating, receiving from the service provider subsystem a customer receipt indicative of a service transaction descriptor of the service transaction, and presenting the customer receipt to the authenticated customer during the active session.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which.

DETAILED DESCRIPTION OF THE DISCLOSURE

Systems, methods, and computer-readable media may be provided for detailing secure service provider transactions. A customer interfacing with a credential manager (e.g., a funder or financial institution) may be enabled to request and obtain securely from the credential manager (e.g., via an online resource running on an electronic device of the customer) additional details related to a service transaction previously effected between the customer and a service provider using a customer transaction credential (e.g., credit card, debit card, etc.) managed by the credential manager. Such additional transaction details may be provided in a customer receipt and may be of any suitable type, including details that may otherwise not be made available to the credential manager (e.g., a description of one or more service provider products provided in the transaction for the benefit of the customer, a description of to whom or how such products were delivered, and/or the like) and/or details describing two or more underlying individual service transactions that may otherwise be represented by a single aggregated transaction, such that certain requirements for the credential manager may be enforced by the service provider in order for the service provider to enable the credential manager to access and present such additional transaction details to a customer in a customer receipt. For example, in order to obtain a detailed customer receipt from the service provider for presentation to a customer, the credential manager may be required to provide an authenticatable customer receipt request to the service provider that may include certain information indicative of an active session between the credential manager and an authenticated customer, certain information indicative of a trusted registered relationship between the credential manager and service provider (e.g., a shared secret), and/or the like. When a customer receipt request is authenticated by the service provider, the service provider may provide the detailed customer receipt to the credential manager in a format that may be presented to the customer (e.g., via an online resource (e.g., application or website) of the credential manager that may be running on an electronic device of the customer) but in a format that may not be used by the credential manager to easily access the transaction details conveyed by the receipt (e.g., an image file format that may not be manipulated by the credential manager to easily access digital textual information indicative of the transaction details). Therefore, a credential manager may be configured to generate a customer receipt request that may be authenticated by a service provider in order for the credential manager to receive and present to a customer certain transaction details while also limiting the ability of the credential manager to otherwise utilize the transaction details.

Figure 1:
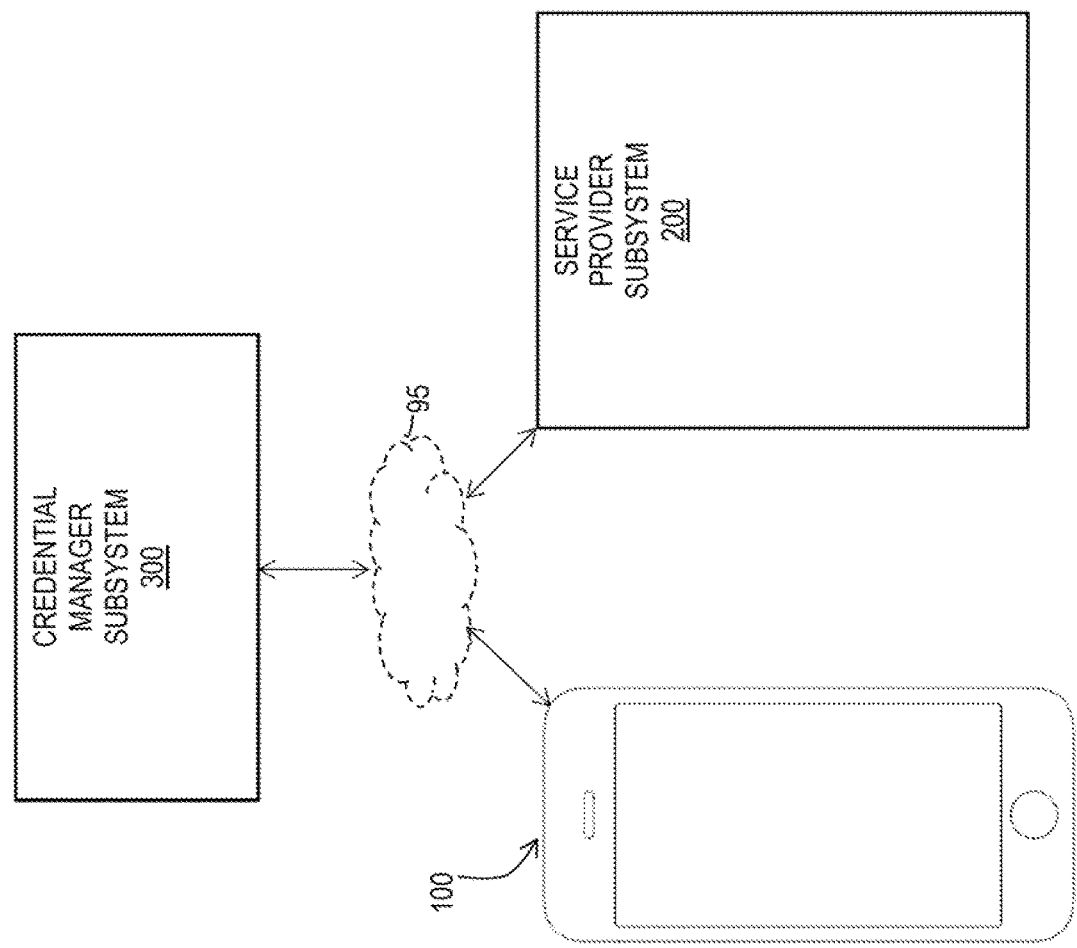
FIG. 1 is a schematic view of an illustrative system for detailing secure service provider transactions.
Figure 2:
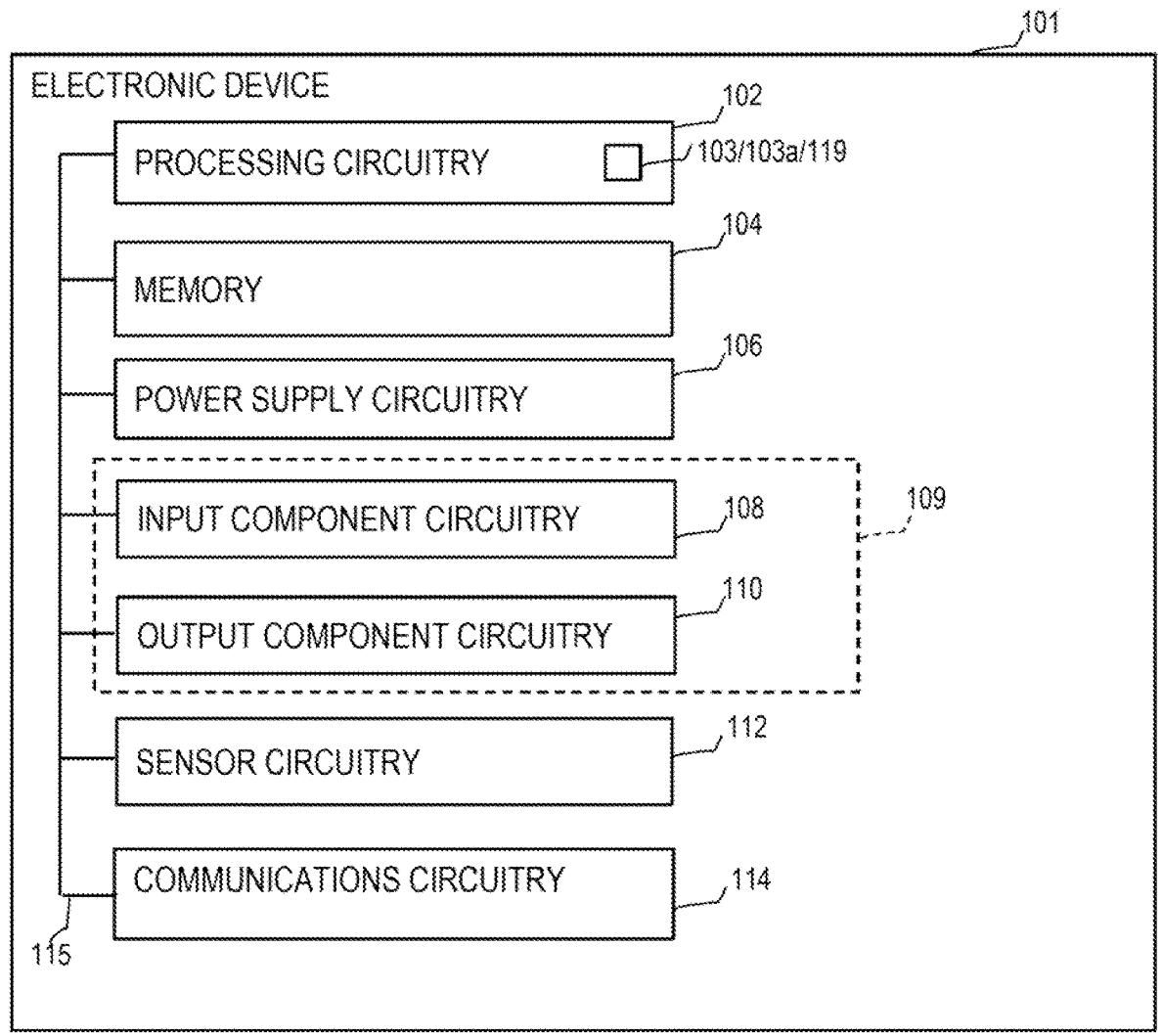
FIG. 2 is a more detailed schematic view of an example electronic device of the system of FIG. 1.
Figure 3:
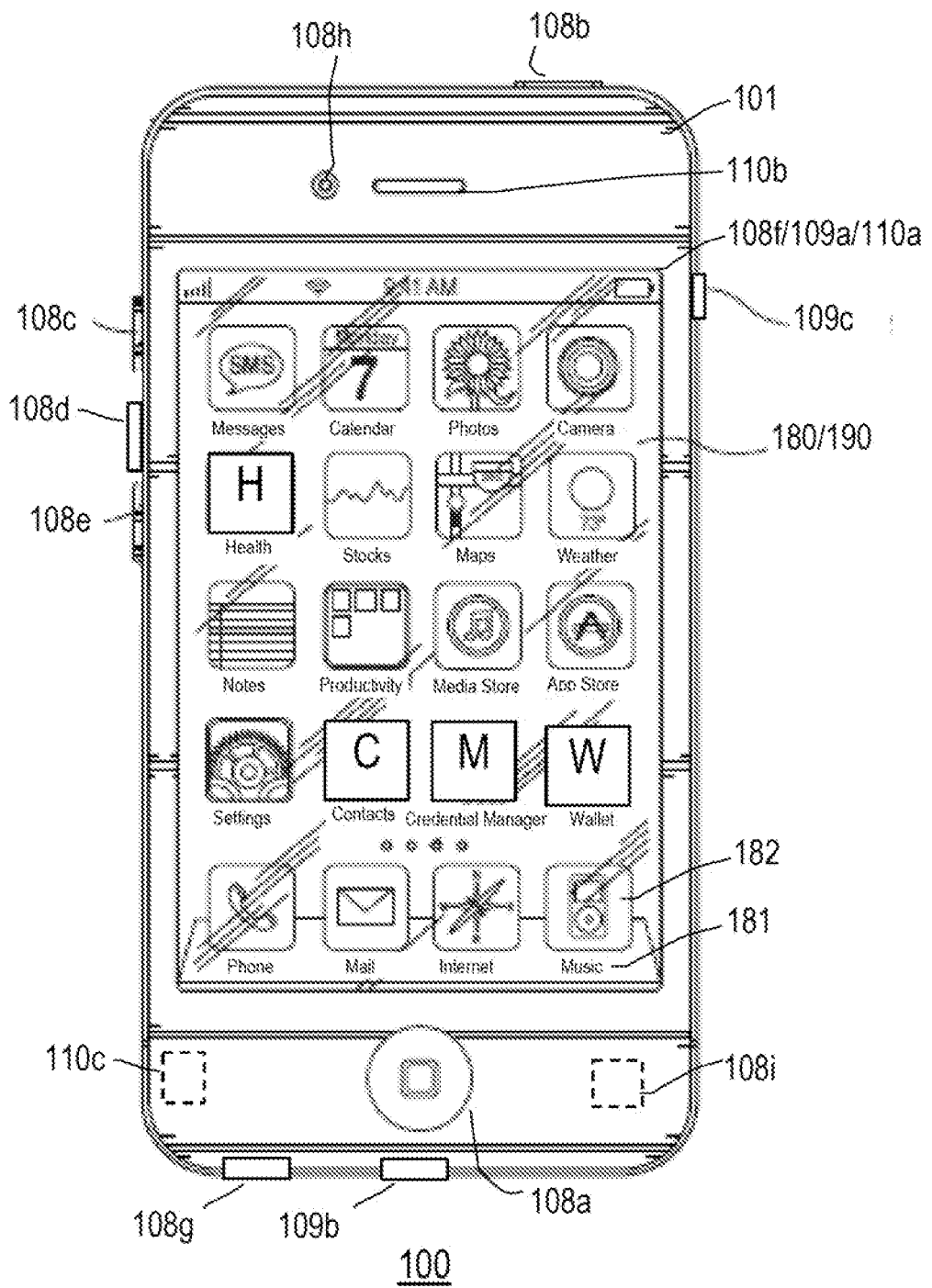
FIG. 3 is a front view of the example electronic device of FIGS. 1 and 2.
Figure 3A:
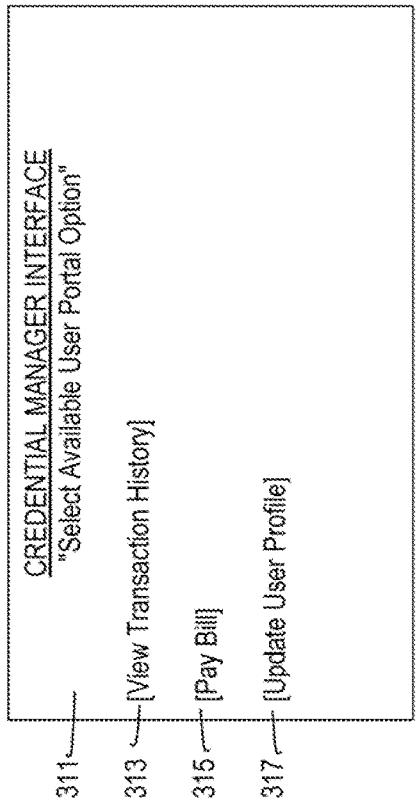
FIGS. 3A-3D are front views of screens of a graphical user interface of at least one electronic device of one or more of FIGS. 1-3 illustrating processes for detailing secure service provider transactions.
Figure 3B:
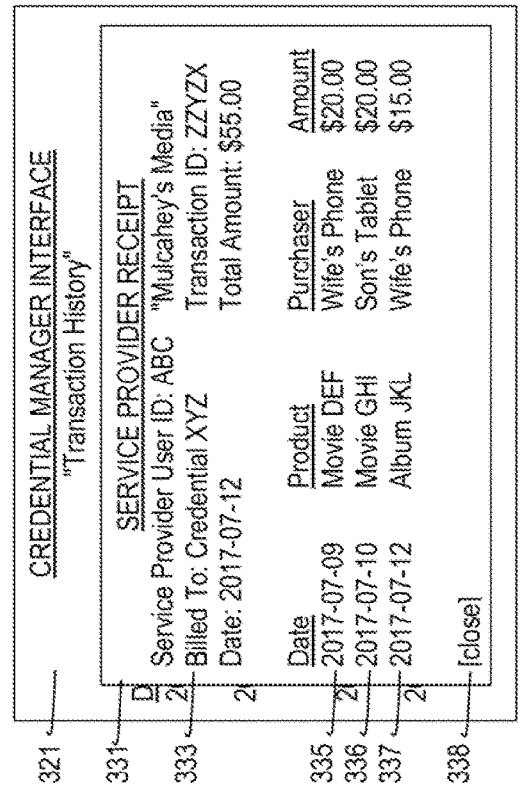
Figure 3C:
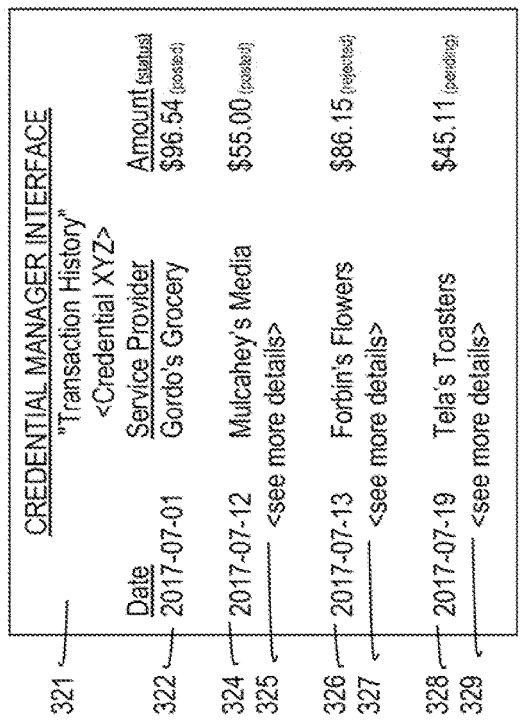
Figure 3D:
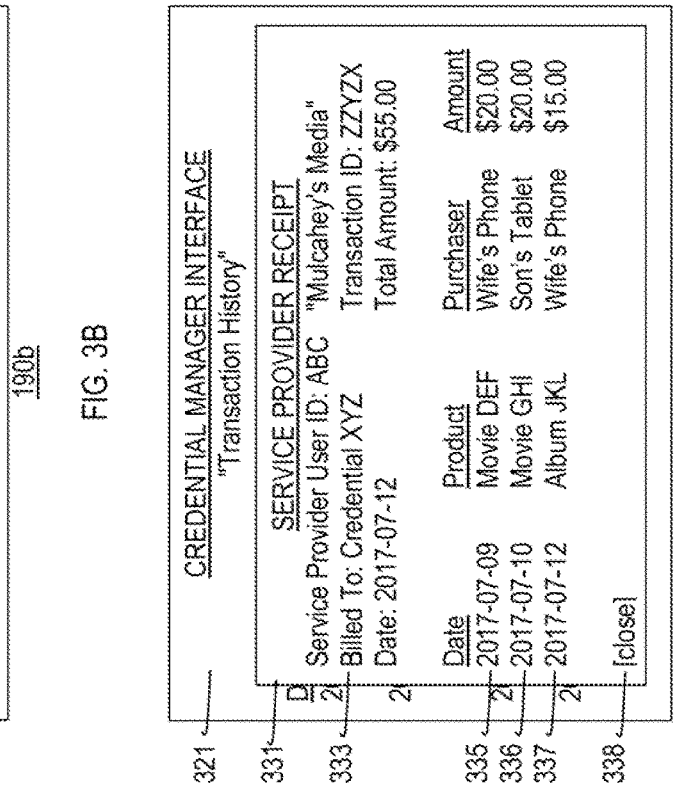
Figure 4:
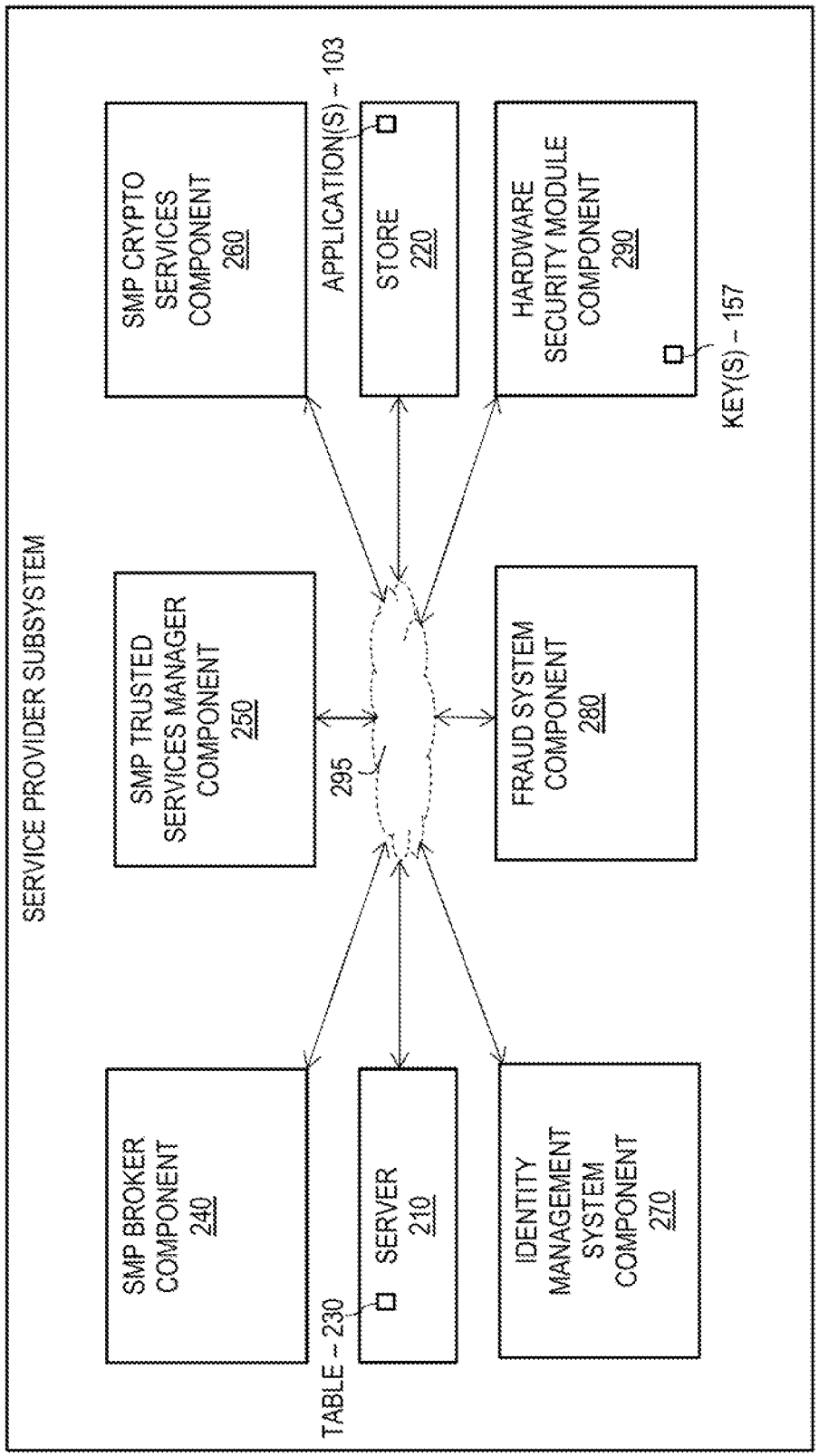
FIG. 4 is a more detailed schematic view of the example service provider subsystem of the system of FIG. 1.

FIG. 1 shows a system 1 in which details of one or more transactions between a user and a service provider ("SP") subsystem 200 may be securely provided to a user electronic device 100 via a credential manager ("CM") subsystem 300, while FIGS. 2 and 3 show further details with respect to particular embodiments of electronic device 100 of system 1, FIGS. 3A-3D show example screens 190a-190d that may be representative of graphical user interfaces of electronic device 100 of system 1 during such a secure detailing, FIG. 4 shows further details with respect to particular embodiments of SP subsystem 200 of system 1, and FIGS. 5-8 are flowcharts of illustrative processes for detailing secure service provider transactions.

Description of FIG. 1

FIG. 1 is a schematic view of an illustrative system 1 that may allow for securely providing service provider transaction details from SP subsystem 200 to electronic device 100 via CM subsystem 300. When SP subsystem 200 may facilitate one or more service transactions with one or more customers (e.g., for one or more goods or services of the SP) using a customer transaction credential (e.g., credit card credential, debit card credential, loyalty card credential, etc.) that may be managed by CM subsystem 300 (e.g., a financial institution subsystem), SP subsystem 200 may communicate to CM subsystem 300 any suitable SP authorization data that may be indicative of the one or more service transactions. Such SP authorization data may include data indicative of the customer transaction credential as well as data indicative of the total amount of funds required from a funding account associated with the customer transaction credential (e.g., an account managed by CM subsystem 300 on behalf of the customer(s)) in order to fund the service transaction(s) as well as any suitable limited transaction information indicative of the transaction(s), such as a limited transaction descriptor that may be indicative of the identity of SP subsystem 200.

CM subsystem 300 may use such SP authorization data to determine whether or not to approve or decline the transfer of funds from the funding account associated with the customer transaction credential to an account associated with SP subsystem 200 (e.g., to fund the service transaction(s) on behalf of the customer). Additionally, CM subsystem 300 may use such SP authorization data to provide limited transaction information indicative of the service transaction(s) (e.g., total amount of funds and identity of SP subsystem 200) to a customer when the customer interfaces with CM subsystem 300 (e.g., to determine the status of the funding account associated with the customer transaction credential (e.g., to determine the status of any service transactions conducted using the customer transaction credential)). For example, a customer may use electronic device 100 to interface with CM subsystem 300 (e.g., via any suitable online resource (e.g., a native app, domain/uniform resource locator ("URL"), or any other suitable web resource associated with the CM of CM subsystem 300)) to request the status of a funding account managed by CM subsystem 300. When proper customer authentication data may be provided by device 100 on behalf of the customer to CM subsystem 300 for accessing information associated with a particular customer transaction credential and its associated funding account, CM subsystem 300 may provide to device 100, for presentation by device 100 to the customer, any suitable limited transaction information of the SP authorization data that may be indicative of the service transaction(s) facilitated by SP subsystem 200 using the customer transaction credential (e.g., the total amount of funds for the transaction(s) and the identity of SP subsystem 200).

However, such limited transaction information of the SP authorization data may not include sufficient enough detail for the customer to fully appreciate the circumstances of the service transaction(s) (e.g., information indicative of the SP's goods/services provided to the customer for the service transaction(s)). Therefore, CM subsystem 300 may enable the customer interfacing with CM subsystem 300 on electronic device 100 to request additional information associated with the service transaction(s) from SP subsystem 200 via CM subsystem 300. Such additional information may not be included in the SP authorization data initially provided to CM subsystem 300 by SP subsystem 200 as the additional information may be indicative of private transaction details that the SP and/or the customer may not wish the SP of SP subsystem 200 to access and/or store. Instead, such additional information may be requested of SP subsystem 200 by CM subsystem 300 on behalf of the customer only when suitable CM authentication data is provided by CM subsystem 300 to SP subsystem 200. Such CM authentication data may include any suitable data required by SP subsystem 200, including, but not limited to, proof of customer authentication at CM subsystem 300, proof of an active session for the authenticated customer with CM subsystem 300, authenticated identification of CM subsystem 300 that is trusted by SP subsystem 200, identification of the service transaction(s) for which additional transaction details are requested, and/or the like. When adequate CM authentication data is provided by CM subsystem 300 to SP subsystem 200 for requesting additional transaction details, such additional transaction details may be identified by SP subsystem 200 and returned to CM subsystem 300 as SP transaction detail data in a format that may be used by CM subsystem 300 to present the additional transaction details to the customer via device 100 (e.g., via any suitable CM online resource accessible by device 100). However, in some embodiments, such additional transaction details may be identified by SP subsystem 200 and returned to CM subsystem 300 as SP transaction detail data in a format that may not be used by CM subsystem 300 to access and/or store such additional transaction details. In other embodiments, such additional transaction details may be identified by SP subsystem 200 and used to define receipt content that may then populate a particular interface portion of an interface provided to the customer via device 100 (e.g., the receipt content may be provided in hypertext markup language ("HTML") and that HTML may be displayed in a web container of CM subsystem 300, such that the content of the CM's web container may be under the control of the SP).

CM subsystem 300 may be provided by any suitable credential manager that may manage any funding account on behalf of a customer and/or that may provide a customer with any suitable customer transaction credential that may be used to identify to a service provider an associated funding account from which funds may be transferred to an account of the service provider in exchange for any suitable goods and/or services of the service provider. CM subsystem 300 may include a payment network subsystem (e.g., a payment card association or a credit card association) and/or an issuing bank subsystem and/or any other suitable type of subsystem. A specific customer transaction credential that may be used during a service transaction with SP subsystem 200 may be associated with a specific funding account of a particular user with CM subsystem 300 (e.g., accounts for various types of payment cards may include credit cards, debit cards, charge cards, stored-value cards (e.g., transit cards), fleet cards, gift cards, and the like). Such a customer transaction credential may be provisioned on device 100 (e.g., as CM credential information of an applet on a secure credential component (e.g., NFC component, secure element, and/or the like) of device 100) by CM subsystem 300 and may later be used by device 100 as at least a portion of a service transaction order communicated to SP subsystem 200 for funding a transaction between a customer and SP subsystem 200 (e.g., to pay for a good or service of the SP of SP subsystem 200). Alternatively, such a customer transaction credential may be provided to a customer as a physical credential card or any suitable credential information that may be relayed by the customer to an SP (e.g., over the telephone or via manual entry into a web form), which may be used by the SP for funding a service transaction.

SP subsystem 200 may be provided by any suitable service provider that may utilize customer transaction credential data to facilitate a service transaction for providing any suitable goods and/or services to a customer or another entity or device of the customer's choosing. As just one example, SP subsystem 200 may be provided by Apple Inc. of Cupertino, Calif., which may be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, etc.), and which may also be a provider, manufacturer, and/or developer of device 100 itself (e.g., when device 100 is an iPod™, iPad™ iPhone™, or the like) and/or of an operating system (e.g., device application 103) of device 100. As another example, SP subsystem 200 may be provided by a restaurant or a movie theater or an airline or a car dealership or any other suitable SP entity. The SP that may provide SP subsystem 200 (e.g., Apple Inc.) may be distinct and independent from any CM of any remote CM subsystem 300 (e.g., any funding entity of any remote funding subsystem, any financial institution entity of any remote financial institution subsystem, etc.). For example, the SP that may provide SP subsystem 200 may be distinct and/or independent from any payment network or issuing bank that may furnish and/or manage any credit card or any other customer transaction credential and/or customer payment credential and/or customer funding credential to be used by a customer for funding a service transaction with SP subsystem 200.

Communication of any suitable data between electronic device 100 and CM subsystem 300 may be enabled via any suitable communications set-up 95, which may include any suitable wired communications path, wireless communications path, or combination of two or more wired and/or wireless communications paths using any suitable communications protocol(s) and/or any suitable network and/or cloud architecture(s). Additionally or alternatively, communication of any suitable data between SP subsystem 200 and CM subsystem 300 may be enabled via any suitable communications set-up 95. Additionally or alternatively, communication of any suitable data between electronic device 100 and SP subsystem 200 that may not be made via CM subsystem 300 may be enabled via any suitable communications set-up 95. Communications set-up 95 may be at least partially managed by one or more trusted service managers ("TSMs"). Any suitable circuitry, device, system, or combination of these (e.g., a wired and/or wireless communications infrastructure that may include one or more communications towers, telecommunications servers, or the like) that may be operative to create a communications network may be used to provide at least a portion of communications set-up 95, which may be capable of providing communications using any suitable wired or wireless communications protocol. For example, communications set-up 95 may support Wi-Fi (e.g., an 802.11 protocol), ZigBee (e.g., an 802.15.4 protocol), WiDi™ Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Description of FIG. 2

As shown in FIG. 2, for example, electronic device 100 may be any suitable electronic device that may interface with CM subsystem 300 in any suitable manner, such as via any suitable online resource, for requesting and/or receiving additional information with respect to a service transaction. For example, electronic device 100 may include, but is not limited to, a media player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, watch or glasses or other wearable, biometric monitor, or any combination thereof. In some embodiments, electronic device 100 may perform a single function (e.g., a device dedicated to interfacing with remote subsystems via online resources) and, in other embodiments, electronic device 100 may perform multiple functions (e.g., a device that interfaces with remote subsystems via online resources and that manages a media library, plays music, and receives and transmits telephone calls). Electronic device 100 may be any portable, mobile, hand-held, or miniature electronic device that may be configured to interface with CM subsystem 300 and/or SP subsystem 200 wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include processing circuitry 102, memory 104, power supply circuitry 106, input component circuitry 108, output component circuitry 110, sensor circuitry 112, and communications circuitry 114. Electronic device 100 may also include a bus 115 that may provide one or more wired or wireless communication links or paths for transferring data and/or power to, from, or between various other components of device 100. In some embodiments, one or more components of electronic device 100 may be combined or omitted. Moreover, electronic device 100 may include any other suitable components not combined or included in FIG. 1 and/or several instances of the components shown in FIG. 1. For the sake of simplicity, only one of each of the components is shown in FIG. 1.

Memory 104 may include one or more storage mediums, including, for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, media information (e.g., media content and/or associated metadata), preference information (e.g., media playback preferences), lifestyle information (e.g., food preferences), exercise information (e.g., information obtained by exercise monitoring equipment or any suitable sensor circuitry), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, pass information (e.g., transportation boarding passes, event tickets, coupons, store cards, financial payment cards, etc.), any other suitable data, or any combination thereof.

Power supply circuitry 106 can include any suitable circuitry for receiving and/or generating power, and for providing such power to one or more of the other components of electronic device 100. For example, power supply circuitry 106 can be coupled to a power grid (e.g., when device 100 is not acting as a portable device or when a battery of the device is being charged at an electrical outlet with power generated by an electrical power plant). As another example, power supply circuitry 106 can be configured to generate power from a natural source (e.g., solar power using solar cells). As another example, power supply circuitry 106 can include one or more batteries for providing power (e.g., when device 100 is acting as a portable device). For example, power supply circuitry 106 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise).

One or more input components 108 may be provided to permit a user to interact or interface with device 100. For example, input component circuitry 108 can take a variety of forms, including, but not limited to, a touch pad, dial, click wheel, scroll wheel, touch screen, one or more buttons (e.g., a keyboard), mouse, joy stick, track ball, microphone, still image camera, video camera, scanner (e.g., a bar code scanner or any other suitable scanner that may obtain product identifying information from a code, such as a bar code, or the like), proximity sensor, light detector, biometric sensor (e.g., a fingerprint reader or facial recognition reader or any other feature recognition sensor, which may operate in conjunction with a feature-processing application that may be accessible to electronic device 100 for authenticating a user), line-in connector for data and/or power, and combinations thereof. Each input component 108 can be configured to provide one or more dedicated control functions for making selections or issuing commands associated with operating device 100.

Electronic device 100 may also include one or more output components 110 that may present information (e.g., graphical, audible, and/or tactile information) to a user of device 100. For example, output component circuitry 110 of electronic device 100 may take various forms, including, but not limited to, audio speakers, headphones, line-out connectors for data and/or power, visual displays, infrared ports, tactile/haptic outputs (e.g., rumblers, vibrators, etc.), and combinations thereof. As a particular example, electronic device 100 may include a display output component as output component 110, where such a display output component may include any suitable type of display or interface for presenting visual data to a user. A display output component may include a display embedded in device 100 or coupled to device 100 (e.g., a removable display). A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O circuitry or I/O interface (e.g., input component 108 and output component 110 as I/O component or I/O interface 109). For example, input component 108 and output component 110 may sometimes be a single I/O component 109, such as a touch screen, that may receive input information through a user's touch (e.g., multi-touch) of a display screen and that may also provide visual information to a user via that same display screen.

Sensor circuitry 112 may include any suitable sensor or any suitable combination of sensors operative to detect movements of electronic device 100 and/or any other characteristics of device 100 or its environment (e.g., physical activity or other characteristics of a user of device 100). For example, sensor circuitry 112 may include any suitable sensor(s), including, but not limited to, one or more of a GPS sensor, accelerometer, directional sensor (e.g., compass), gyroscope, motion sensor, pedometer, passive infrared sensor, ultrasonic sensor, microwave sensor, a tomographic motion detector, a camera, a biometric sensor, a light sensor, a timer, or the like. In some examples, a biometric sensor may include, but is not limited to, one or more health-related optical sensors, capacitive sensors, thermal sensors, electric field ("eField") sensors, and/or ultrasound sensors, such as photoplethysmogram ("PPG") sensors, electrocardiography ("ECG") sensors, galvanic skin response ("GSR") sensors, posture sensors, stress sensors, photoplethysmogram sensors, and/or the like. While specific examples are provided, it should be appreciated that other sensors can be used and other combinations of sensors can be combined into a single device. In some examples, a GPS sensor or any other suitable location detection component(s) of device 100 can be used to determine a user's location and movement, as well as a displacement of the user's motion.

Communications circuitry 114 may be provided to allow device 100 to communicate with one or more other electronic devices or servers using any suitable communications protocol (e.g., with CM subsystem 300 and/or with SP subsystem 200 using communications set-up 95). For example, communications circuitry 114 may support Wi-Fi™ (e.g., an 802.11 protocol), ZigBee™ (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, Near Field Communication ("NFC"), any other communications protocol, or any combination thereof. Communications circuitry 114 may also include or be electrically coupled to any suitable transceiver circuitry that can enable device 100 to be communicatively coupled to another device (e.g., a host computer or an accessory device) and communicate with that other device wirelessly, or via a wired connection (e.g., using a connector port). Communications circuitry 114 may be configured to determine a geographical position of electronic device 100. For example, communications circuitry 114 may utilize the global positioning system ("GPS") or a regional or site-wide positioning system that may use cell tower positioning technology or Wi-Fi™ technology.

Processing circuitry 102 of electronic device 100 may include any processing circuitry that may be operative to control the operations and performance of one or more components of electronic device 100. For example, processor 102 may receive input signals from any input component 108 and/or sensor circuitry 112 and/or communications circuitry 114 and/or drive output signals through any output component 110 and/or communications circuitry 114. As shown in FIG. 1, processor 102 may be used to run at least one application 103. Application 103 may include, but is not limited to, one or more operating system applications, firmware applications, software applications, third party applications (e.g., applications managed by the SP of SP subsystem 200, the CM of CM subsystem 300, and/or the like), online resource applications, algorithmic modules, media analysis applications, media playback applications, media editing applications, communications applications, pass applications, calendar applications, social media applications, state determination applications, biometric feature-processing applications, activity monitoring applications, activity motivating applications, and/or any other suitable applications. For example, processor 102 may load application 103 as a user interface program to determine how instructions or data received via an input component 108 and/or any other component of device 100 may manipulate the one or more ways in which information may be stored and/or provided to the user via an output component 110 and/or any other component of device 100. Any application 103 may be accessed by any processing circuitry 102 from any suitable source, such as from memory 104 (e.g., via bus 115) and/or from another device or server (e.g., from CM subsystem 300 and/or from SP subsystem 200 (e.g., via an active internet connection (e.g., via communications circuitry 114))). For example, application 103 may be any suitable internet browsing application (e.g., for interacting with a website provided by CM subsystem 300 and/or by SP subsystem 200 for enabling device 100 to interact with an online service of CM subsystem 300 and/or SP subsystem 200), any suitable CM application (e.g., a web application or a native application that may be at least partially produced by CM subsystem 300 for enabling device 100 to interact with an online service of CM subsystem 300), any suitable SP application (e.g., a web application or a native application that may be at least partially produced by SP subsystem 200 for enabling device 100 to interact with an online service of SP subsystem 200), or any other suitable applications. As one example, an application 103 may provide a user with the ability to interact with a service or platform of CM subsystem 300, where such an application 103 may be a third party application that may be running on device 100 (e.g., an application associated with CM subsystem 300 that may be loaded on device 100 from CM subsystem 300 or via an application market (e.g., from SP subsystem 200 if a media market SP) and/or that may be accessed via an internet application or web browser running on device 100 (e.g., processor 112) that may be pointed to a URL whose target or web resource may be managed by CM subsystem 300 (e.g., running on a server of CM subsystem 300) or any other remote subsystem. Therefore, application 103 may be configured to provide a CM online resource, such as a website or native online application, for presentation of a CM interface to a user on device 100. In a particular example, as shown in FIG. 2, processor 102 may be used to run a first application 103 that may be an operating system application and a second application 103a that may be a third party application or any other suitable online resource (e.g., an application associated with a credential manager of CM subsystem 300). Moreover, processor 102 may have access to device identification information 119, which may be utilized to provide identification of device 100 (e.g., identification of the particular device 100 and/or identification of the type of device 100 (e.g., make and/or model and/or the like). Processor 102 may include a single processor or multiple processors. For example, processor 102 may include at least one "general purpose" microprocessor, a combination of general and special purpose microprocessors, instruction set processors, graphics processors, video processors, communications processors, motion processors, biometric processors, application processors, and/or related chips sets, and/or special purpose microprocessors. Processor 102 also may include on board memory for caching purposes.

Although not shown, device 100 may include any suitable secure credential component (e.g., NFC component, secure element, and/or the like) that may include or otherwise be configured to provide a tamper-resistant platform (e.g., as a single-chip or multiple-chip secure microcontroller) that may be capable of securely hosting applications and their confidential and cryptographic data in accordance with rules and security requirements that may be set forth by a set of well-identified trusted authorities (e.g., an authority of SP subsystem 200 and/or of CM subsystem 300 and/or of an industry standard, such as GlobalPlatform). Any suitable customer transaction credential information, such as CM credential information, may be stored in an applet on such a secure credential component of device 100 and may be configured to provide customer transaction credential data for use in any suitable service transaction order with a remote entity subsystem, such as SP subsystem 200. For example, the customer transaction credential data may provide an actual value source and/or may provide sufficient detail for identifying a funding account of CM subsystem 300 that may be used to as a value source, and the value source may be used to at least partially fund a service transaction between electronic device 100 and SP subsystem 200 for any suitable service provider service (e.g., any suitable good or service that may be provided on behalf of SP subsystem 200 for the benefit of a user of electronic device 100).

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 108 may be an independent keyboard or mouse within its own housing that may wirelessly or through a wire communicate with processor 102, which may be provided within its own housing).

Although not shown, SP subsystem 200 may also include a processor component that may be the same as or similar to processor component 102 of electronic device 100, a communications component that may be the same as or similar to communications component 114 of electronic device 100, an I/O interface that may be the same as or similar to I/O interface 109 of electronic device 100, a bus that may be the same as or similar to bus 115 of electronic device 100, a memory component that may be the same as or similar to memory 104 of electronic device 100, and/or a power supply component that may be the same as or similar to power supply 106 of electronic device 100.

Although not shown, CM subsystem 300 may also include a processor component that may be the same as or similar to processor component 102 of electronic device 100, a communications component that may be the same as or similar to communications component 114 of electronic device 100, an I/O interface that may be the same as or similar to I/O interface 109 of electronic device 100, a bus that may be the same as or similar to bus 115 of electronic device 100, a memory component that may be the same as or similar to memory 104 of electronic device 100, and/or a power supply component that may be the same as or similar to power supply 106 of electronic device 100.

Description of FIG. 3

As shown in FIG. 3, one specific example of electronic device 100 may be an electronic device, such as an iPhone™, where housing 101 may allow access to various input components 108a-108i, various output components 110a-110c, and various I/O components 109a-109c through which device 100 and a user and/or an ambient environment may interface with each other. Input component 108a may include a button that, when pressed, may cause a "home" screen or menu of a currently running application to be displayed by device 100. Input component 108b may be a button for toggling electronic device 100 between a sleep mode and a wake mode or between any other suitable modes. Input component 108c may include a two-position slider that may disable one or more output components 112 in certain modes of electronic device 100. Input components 108d and 108e may include buttons for increasing and decreasing the volume output or any other characteristic output of an output component 110 of electronic device 100. Each one of input components 108a-108e may be a mechanical input component, such as a button supported by a dome switch, a sliding switch, a control pad, a key, a knob, a scroll wheel, or any other suitable form.

An output component 110a may be a display that can be used to display a visual or graphic user interface ("GUI") 180, which may allow a user to interact with electronic device 100. A screen 190 of GUI 180 may include various layers, windows, screens, templates, elements, menus, and/or other components of a currently running application (e.g., application 103) that may be displayed in all or some of the areas of display output component 110a. One or more of user input components 108a-108i may be used to navigate through GUI 180. For example, one user input component 108 may include a scroll wheel that may allow a user to select one or more graphical elements or icons 182 of GUI 180. Icons 182 may also be selected via a touch screen I/O component 109a that may include display output component 110a and an associated touch input component 108f. Such a touch screen I/O component 109a may employ any suitable type of touch screen input technology, such as, but not limited to, resistive, capacitive, infrared, surface acoustic wave, electromagnetic, or near field imaging. Furthermore, touch screen I/O component 109a may employ single point or multi-point (e.g., multi-touch) input sensing.

Icons 182 may represent various applications, layers, windows, screens, templates, elements, and/or other components that may be displayed in some or all of the areas of display component 110a upon selection by the user. Furthermore, selection of a specific icon 182 may lead to a hierarchical navigation process. For example, selection of a specific icon 182 may lead from screen 190 of FIG. 3 to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. As an example, when the specific icon labeled with a "Calendar" textual indicator is selected, device 100 may launch or otherwise access a specific calendar or reminder application and may display screens of a specific user interface that may include one or more tools or features for interacting with one or more events or other reminders that may be time-sensitive in a specific manner. As another example, when the specific icon labeled with a "Credential Manager" textual indicator is selected, device 100 may launch or otherwise access a specific CM application (e.g., CM online resource) and may display screens of a specific user interface that may include one or more tools or features for interacting with CM subsystem 300 in a specific manner. As another example, when the specific icon labeled with a "Wallet" textual indicator is selected, device 100 may launch or otherwise access a specific pass or wallet application and may display screens of a specific user interface that may include one or more tools or features for interacting with one or more passes or other credentials (e.g., payment credentials of an NFC and/or secure element component of device 100) in a specific manner. For each application, screens may be displayed on display output component 110a and may include various user interface elements. Additionally or alternatively, for each application, various other types of non-visual information may be provided to a user via various other output components 110 of device 100.

Electronic device 100 also may include various other I/O components 109 that may allow for communication between device 100 and other devices, such as a connection port 109b that may be configured for transmitting and receiving data files, such as media files or customer order files, and/or any suitable information (e.g., audio signals) from a remote data source and/or power from an external power source. For example, I/O component 109b may be any suitable port (e.g., a Lightning™ connector or a 30-pin dock connector available by Apple Inc.). I/O component 109c may be a connection slot for receiving a SIM card or any other type of removable component. Electronic device 100 may also include at least one audio input component 110g, such as a microphone, and at least one audio output component 110b, such as an audio speaker. Electronic device 100 may also include at least one tactile output component 110c (e.g., a rumbler, vibrator, haptic and/or taptic component, etc.), a camera and/or scanner input component 108h (e.g., a video or still camera, and/or a bar code scanner or any other suitable scanner that may obtain product identifying information from a code, such as a bar code, or the like), and a biometric input component 108i (e.g., a fingerprint reader or other feature recognition sensor, which may operate in conjunction with a feature-processing application that may be accessible to electronic device 100 for authenticating a user).

Description of FIG. 4

Referring now to FIG. 4, FIG. 4 shows further details with respect to particular embodiments of SP subsystem 200 of system 1. As shown in FIG. 4, SP subsystem 200 may be a secure platform system and may include a secure mobile platform ("SMP") broker component 240, an SMP trusted services manager ("TSM") component 250, an SMP crypto services component 260, an identity management system ("IDMS") component 270, a fraud system component 280, a hardware security module ("HSM") component 290, store component 220, and/or one or more servers 210. One, some, or all components of SP subsystem 200 may be implemented using one or more processor components, which may be the same as or similar to processor circuitry 102 of device 100, one or more memory components, which may be the same as or similar to memory 104 of device 100, and/or one or more communications components, which may be the same as or similar to communications circuitry 114 of device 100. One, some, or all components of SP subsystem 200 may be managed by, owned by, at least partially controlled by, and/or otherwise provided by a single SP (e.g., Apple Inc.) that may be distinct and independent from any CM subsystem 300. The components of SP subsystem 200 may interact with each other and collectively with any suitable CM subsystem 300 and/or electronic device 100 for facilitating one or more service transactions and/or for securely providing service transaction details to a customer via CM subsystem 300.

SMP broker component 240 of SP subsystem 200 may be configured to manage customer authentication with an SP customer account of SP subsystem 200 and/or to manage CM validation with a CM subsystem account of SP subsystem 200. SMP broker component 240 may be a primary end point that may control certain interface elements (e.g., elements of a GUI 180) on device 100. A CM application of CM subsystem 300 may be configured to call specific application programming interfaces ("APIs") and SMP broker 240 may be configured to process requests of those APIs and respond with data that may derive a portion of a user interface that may be presented by CM subsystem 300 (e.g., to device 100) and/or respond with application protocol data units ("APDUs") that may communicate with CM subsystem 300. Such APDUs may be received by SP subsystem 200 from CM subsystem 300 via a trusted services manager ("TSM") of system 1 (e.g., a TSM of a communication path between SP subsystem 200 and CM subsystem 300. In some particular embodiments, SMP TSM component 250 of SP subsystem 200 may be configured to provide Global Platform-based services or any other suitable services that may be used to carry out credential provisioning operations on device 100 from CM subsystem 300. GlobalPlatform, or any other suitable secure channel protocol, may enable SMP TSM component 250 to properly communicate and/or provision sensitive account data between a secure element of device 100 and a TSM for secure data communication between SP subsystem 200 and a remote subsystem.

SMP TSM component 250 may be configured to use HSM component 290 to protect keys and generate new keys. SMP crypto services component 260 of SP subsystem 200 may be configured to provide key management and cryptography operations that may be provided for user authentication and/or confidential data transmission between various components of system 1 (e.g., between SP subsystem 200 and CM subsystem 300). SMP crypto services component 260 may utilize HSM component 290 for secure key storage and/or opaque cryptographic operations. A payment crypto service of SMP crypto services component 260 may be configured to interact with IDMS component 270 to retrieve information associated with on-file credit cards or other types of customer transaction credentials associated with user accounts of the SP (e.g., an Apple iCloud™ account). Such a payment crypto service may be configured to be the only component of SP subsystem 200 that may have clear text (e.g., non-hashed) information describing customer transaction credentials (e.g., credit card numbers) of its user accounts in memory. Fraud system component 280 of SP subsystem 200 may be configured to run an SP fraud check on a customer transaction credential based on data known to the SP about the transaction credential and/or the customer (e.g., based on data (e.g., customer transaction credential information) associated with a customer account with the SP and/or any other suitable data that may be under the control of the SP and/or any other suitable data that may not be under the control of a remote subsystem). Fraud system component 280 may be configured to determine an SP fraud score for the credential based on various factors or thresholds. Additionally or alternatively, SP subsystem 200 may include store 220, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, etc.). As just one example, store 220 may be configured to manage and provide an application 103 and/or application 103a to device 100, where the application may be any suitable application, such as a CM application (e.g., a banking application), an SP application, an e-mail application, a text messaging application, an internet application, a credential management application, or any other suitable communication application. Any suitable communication protocol or combination of communication protocols may be used by SP subsystem 200 to communicate data amongst the various components of SP subsystem 200 (e.g., via at least one communications path 295 of FIG. 4) and/or to communicate data between SP subsystem 200 and other components of system 1 (e.g., CM subsystem 300 and/or electronic device 100).

Description of FIGS. 3A-3D and FIG. 5

Figure 5:
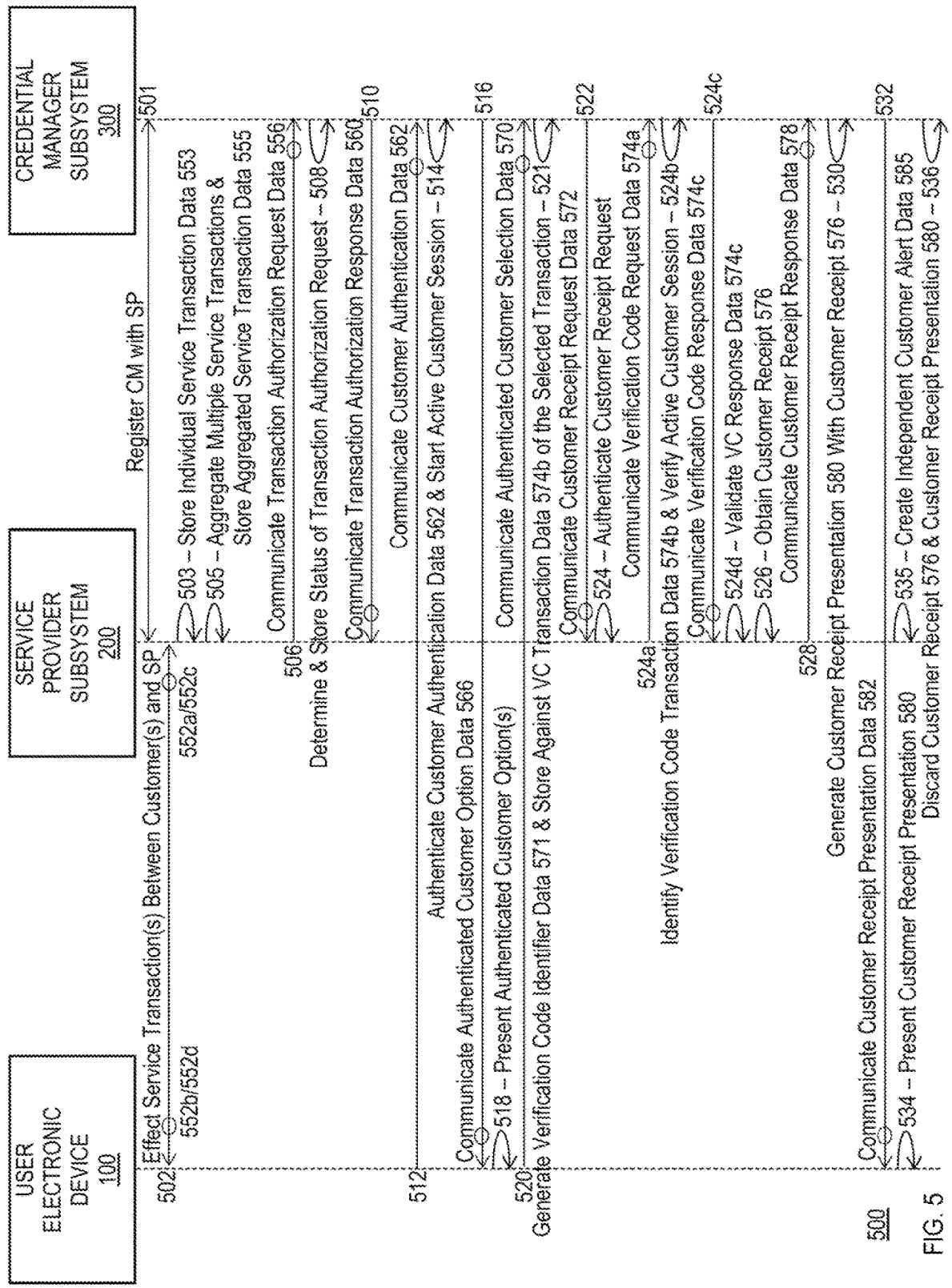
FIGS. 5-8 are flowcharts of illustrative processes for detailing secure service provider transactions.

FIG. 5 is a flowchart of an illustrative process 500 for detailing secure service provider transactions. Process 500 is shown being implemented by electronic device 100, SP subsystem 200, and CM subsystem 300. However, it is understood that process 500 may be implemented using any other suitable components or subsystems. Process 500 may provide a seamless user experience for securely and efficiently providing SP transaction details for a service transaction from SP subsystem 200 to electronic device 100 via CM subsystem 300, such as in response to CM subsystem 300 receiving a customer request for such SP transaction details from electronic device 100. To facilitate the following discussion regarding the operation of system 1 for detailing secure service provider transactions according to process 500 of FIG. 5, reference is made to various components of system 1 of the schematic diagrams of FIGS. 1-4, and to front views of screens 190a-190d of FIGS. 3A-3D that may be representative of a graphical user interface of device 100 (e.g., a GUI as may be provided by a CM online resource (e.g., a CM application 103) or any suitable application of device 100) during such a process. The operations described may be achieved with a wide variety of graphical elements and visual schemes. Therefore, the embodiments of FIGS. 3A-3D are not intended to be limited to the precise user interface conventions adopted herein. Rather, embodiments may include a wide variety of user interface styles. While the term "service provider" may be utilized for describing service provider subsystem 200 and/or any feature thereof, it is understood that subsystem 200 may be any suitable subsystem operated by any suitable third party entity that may be distinct from an owner or user of electronic device 100 and/or from CM subsystem 300. For example, service provider subsystem 200 may be any suitable third party subsystem that may enable secure retention of and selective secure sharing of transaction details with a customer via CM subsystem 300, where such a third party subsystem may be used by one or more various service provider subsystems to provide the functionality of process 500 to various customers and/or various credential manager subsystems.

At operation 501 of process 500, CM subsystem 300 may be registered with SP subsystem 200 for enabling CM subsystem 300 to be a trusted partner of SP subsystem 200 for carrying out later operations of process 500. For example, SP subsystem 200 may populate a table 230 (e.g., at server 210 or otherwise) and/or a data storage portion of HSM component 290 to associate a CM key 157 with CM subsystem 300 (e.g., with a unique IP address and/or unique CM partner ID and/or the like of CM subsystem 300, such as for later identification and recall of an appropriate CM key 157) for enabling a secure data communication channel between CM subsystem 300 and SP subsystem 200 (e.g., for any suitable future data communicated therebetween). Both SP subsystem 200 and CM subsystem 300 may store a version of such a CM key 157 (e.g., in a respective secure element or memory component of CM subsystem 300 (not shown)) and in a respective secure element or memory component of SP subsystem 200 (e.g., in HSM component 290, as shown in FIG. 4). For example, in some embodiments, in order to participate in a service transaction detail sharing program facilitated by SP subsystem 200, a CM may be required to register as a member of the program by setting up such a CM key share with SP subsystem 200 (e.g., at operation 501). CM key 157 may provide any suitable shared secret between CM subsystem 300 and SP subsystem 200 (e.g., CM key 157 of SP subsystem 200 may be the same as or associated with a CM key stored at CM subsystem 300 (e.g., they may be a public/private key pair)) to enable secure communication of any suitable data between subsystems 200 and 300. Such a shared secret between CM subsystem 300 and SP subsystem 200 may be any suitable shared secret (e.g., a password, passphrase, array of randomly chosen bytes, one or more symmetric keys, public-private keys (e.g., asymmetric keys), etc.) to both CM subsystem 300 and SP subsystem 200 that may be operative to enable any suitable data (e.g., a cryptogram) or any other suitable data to be independently generated by CM subsystem 300 and SP subsystem 200 (e.g., for validating the identity of a subsystem or data shared therebetween), such as by using any suitable cryptographic algorithm or cipher whose functional output may be at least partially determined by the shared secret, where such a shared secret may be provisioned on subsystem 300 by subsystem 200 or vice versa. A shared secret may either be shared beforehand, in which case such a shared secret may be referred to as a pre-shared key, and/or a shared secret may be created prior to use (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to SP subsystem 200 and CM subsystem 300. Due to the fact that SP subsystem 200 and CM subsystem 300 may each contain or have access to CM key 157, CM subsystem 300 may securely share data encrypted with the shared secret that may then be decrypted by SP subsystem 200 with the shared secret and/or vice versa, while the shared secret may not be made available to another subsystem nor may the data be shared in an unencrypted state with another subsystem. CM key 157 may be managed by SP subsystem 200 and/or by CM subsystem 300, such that CM key 157 may be maintained and/or updated and/or deleted as needed to maintain its effectiveness. Therefore, CM key 157 may never be stored on or otherwise accessible to a subsystem other than CM subsystem 300 and SP subsystem 200. For example, CM key 157 may not be stored on another SP subsystem other than SP subsystem 200 and/or on another CM subsystem other than CM subsystem 300 and/or on another different type of subsystem, such as an acquiring bank subsystem associated with SP subsystem 200, for example. CM key 157 can be revocable or may expire after a certain amount of time, which may require CM subsystem 300 and SP subsystem 200 to communicate every so often to manage and/or update CM key 157. This may enable SP subsystem 200 to dictate which CM subsystem(s) may be able to participate in a service transaction detail sharing program facilitated by SP subsystem 200.

At operation 502 of process 500, one or more customers may interact with SP subsystem 200 to effect one or more service transactions between SP subsystem 200 and one or more desired beneficiaries. As shown in FIG. 5, in one exemplary embodiment, electronic device 100 may be used by a customer to interact with SP subsystem 200 to effect one or more service transactions. For example, in a first iteration of operation 502 for effecting a first service transaction, first customer transaction order data 552*a* may be communicated by a customer (e.g., via device 100) to SP subsystem 200, where first customer transaction order data 552*a* may include data indicative of a customer transaction credential (e.g., information indicative of a customer transaction credential that may have been previously provided to the customer by CM subsystem 300 and that may be associated with a funding account of the customer that may be managed by CM subsystem 300) as well as data indicated of a customer transaction order (e.g., information indicative of an SP product (e.g., an SP's good and/or service) to be obtained from SP subsystem 200 and/or information indicative of how such an SP product is to be delivered to the customer or to any other suitable beneficiary), and, responsive thereto, a first SP product 552*b* may be communicated from SP subsystem 200 to an appropriate beneficiary. As just one example, first customer transaction order data 552*a* may be provided to SP subsystem 200 by a customer entering customer transaction credential information (e.g., credit card information) and other order information (e.g., specification of a product, a delivery address, etc.) into a web form of an online resource of SP subsystem 200 that may be running on device 100 (e.g., a commerce website of the SP), while SP product 552*b* may be electronically communicated to device 100 by SP subsystem 200 (e.g., a digital movie file may be downloaded onto device 100 from SP subsystem 200). As another example, first customer transaction order data 552*a* may be provided to SP subsystem 200 by a customer calling an SP of SP subsystem 200 and orally providing customer transaction credential information (e.g., credit card information) and other order information (e.g., specification of a product and a delivery address) over the telephone or in person, while SP product 552*b* may be provided to a beneficiary by an SP of SP subsystem 200 mailing a particular SP product to the beneficiary (i.e., although FIG. 5 may show operation 502 being carried out between device 100 and SP subsystem 200, device 100 may not be needed in order for a customer to communicate order data 552*a* to SP subsystem 200). As also shown, in a second iteration of operation 502 for effecting a second service transaction, second customer transaction order data 552*c* may be communicated by a customer (e.g., via device 100) to SP subsystem 200, where second customer transaction order data 552*c* may include data indicative of a customer transaction credential (e.g., information indicative of the same customer transaction credential that may have been previously used in first transaction order data 552*a* or a different customer transaction credential) as well as data indicated of a customer transaction order (e.g., information indicative of an SP product to be obtained from SP subsystem 200 and/or information indicative of how such an SP product is to be delivered to the customer or to any other suitable beneficiary), and, responsive thereto, a second SP product 552*d* may be communicated from SP subsystem 200 to an appropriate beneficiary. For example, second customer transaction order data 552*c* may be provided to SP subsystem 200 by a customer using customer SP login information for SP subsystem 200 that may authenticate the customer to a customer account with the SP that already has stored particular customer transaction credential information (e.g., credit card information) and other order information (e.g., specification of a product and a delivery address) into a native app online resource of SP subsystem 200 that may be running on device 100 (e.g., a native commerce application of the SP (e.g., iTunes™ by Apple Inc.)), while SP product 552*d* may be electronically communicated to device 100 by SP subsystem 200 (e.g., a digital music file may be downloaded onto device 100 from SP subsystem 200). It is understood that only one iteration of operation 502 may occur for effecting only a single service transaction at operation 502, or any suitable number of iterations of operation 502 may occur for effecting any suitable number of service transactions at operation 502 (e.g., with respect to a particular customer transaction credential).

At operation 503 of process 500, when an individual service transaction has been effected at a single iteration of operation 502 in any suitable manner that meets any suitable first type of condition, various details associated with the individual service transaction may be stored by SP subsystem 200 (e.g., in table 230) as individual service transaction data 553 (e.g., individual SP transaction detail data). For example, any suitable unique individual service transaction identifier ("ISTI") (e.g., a unique individual web order ID ("IWOI")) may be generated or otherwise obtained (e.g., by SP subsystem 200) and then stored against any suitable details associated with the individual service transaction (e.g., in table 230 of SP subsystem 200 as individual service transaction data 553), where such individual service transaction details ("ISTDs") of the individual service transaction may be any suitable details, including, but not limited to, any suitable description (e.g., text, graphics, etc.) of the SP product being purchased (e.g., SP product 552*b* (e.g., "Groceries A & B & C", "Movie GHI", etc.)), any suitable description of the customer and/or customer's device (e.g., device 100 (e.g., using device identification information 119)) used to make the purchase (e.g., the entity that communicated customer transaction order data 552*a* to SP subsystem 200 (e.g., "Customer A", "Jack's iPhone™", etc.)), any suitable description of the customer transaction credential used to make the purchase (e.g., "limited transaction credential data," such as any suitable description of the customer transaction credential used to make the purchase (e.g., a hashed version (e.g., last 4 digits) of a credit card number associated with the credential (e.g., "Credential XYZ") or a wallet user identifier (e.g., a user identifier associated with the customer for the credential manager of the credential being used) or the like), any suitable description of the CM responsible for the customer transaction credential (e.g., a unique identifier for the CM, such as a bank ID number ("BIN") (e.g., a 6-digit issuer identifier associated to the transaction), CM Partner ID (e.g., a code that may be generated by the SP and assigned to a particular payment partner or third party provider (e.g., at operation 501)), CM Issuer ID (e.g., a code that may be generated by the SP and assigned to a particular payment issuer (e.g., at operation 501)), etc.), any suitable description of the amount (to be) charged for the SP product being purchased (e.g., $USD 96.54), any suitable description of the beneficiary (e.g., recipient of the SP product being purchased (e.g., "Customer A's Address", "Jack's iPhone™", etc.), any suitable description of the time at which the individual service transaction was effected (e.g., the time of the iteration of operation 502 associated with the individual service transaction), any suitable description of a customer identifier of a customer account at SP subsystem 200 of the customer that effected the service transaction (e.g., "Customer A's SP-log-in user name", etc.), any suitable description of the SP of SP subsystem, and/or the like. Such a stored link or association between such an ISTI (IWOI) and any/all such ISTDs may be stored as individual service transaction data 553 at SP subsystem 200 (e.g., in table 230) and later used by SP subsystem 200 to validate a request from a CM subsystem for such ISTDs and/or to locate and utilize such ISTDs to generate an appropriate response to such a request. Any suitable first type of condition may be satisfied in order for SP subsystem 200 to store individual service transaction data 553 for an individual service transaction that has been effected at a single iteration of operation 502, such as every time an individual service transaction has been effected at operation 502, only when a single individual service transaction has been effected within a particular duration of time (e.g., 3 days, 5 days, 7 days, etc.).

Additionally or alternatively, at operation 505 of process 500, when two or more individual service transactions have been effected at two or more respective iterations of operation 502 in any suitable manner that meets any suitable second type of condition, various details associated with each one of the individual service transactions may be aggregated and stored by SP subsystem 200 (e.g., in table 230) as aggregated service transaction data 555 (e.g., aggregated SP transaction detail data). For example, any suitable unique aggregated service transaction identifier ("ASTI") (e.g., a unique aggregated web order ID ("AWOI")) may be generated or otherwise obtained (e.g., by SP subsystem 200) and then stored against any suitable details associated with each one of the individual service transactions (e.g., in table 230 of SP subsystem 200 as aggregated service transaction data 555), where such details of each one of the individual service transactions may be any suitable details similar to those described above with respect to data 553 of operation 503, including, but not limited to, any suitable description e.g., text, graphics, etc.) of each SP product being purchased (e.g., SP product 552*b* (e.g., "Movie GHI") and SP product 552*d* (e.g., "Album JKL")), any suitable description of each customer and/or customer's device (e.g., device 100) used to make each purchase (e.g., the entity that communicated customer transaction order data 552*a* to SP subsystem 200 (e.g., "Jack's iPhone™") and the entity that communicated customer transaction order data 552*c* to SP subsystem 200 (e.g., "Jill's iPad™")), any suitable description of the customer transaction credential used to make each purchase (e.g., "limited transaction credential data," such as any suitable description of the customer transaction credential used to make the purchase (e.g., a ashed version (e.g., last 4 digits) of a credit card number associated with the credential (e.g., "Credential XYZ") or a wallet user identifier (e.g., a user identifier associated with the customer for the credential manager of the credential being used) or the like), any suitable description of the CM responsible for the customer transaction credential (e.g., a unique identifier for the CM, such as a BIN, CM Partner ID, CM Issuer ID, etc.), any suitable description of the amount (to be) charged for each SP product being purchased (e.g., $USD 20.00 for the first transaction and $USD 15.00 for the second transaction), any suitable description of the total amount (to be) charged for all the aggregated SP products being purchased (e.g., $USD 35.00 total for the aggregation of $USD 20.00 for the first transaction and $USD 15.00 for the second transaction), any suitable description of the beneficiary of each transaction (e.g., the recipient of the first SP product being purchased and the recipient of the second SP product being purchased), any suitable description of the time at which each individual service transaction was effected (e.g., the time of the first iteration of operation 502 associated with the first individual service transaction and the time of the second iteration of operation 502 associated with the second individual service transaction), any suitable description of a customer identifier of a customer account at SP subsystem 200 of the customer that effected each service transaction, any suitable description of the SP of SP subsystem, an aggregated total amount (to be) charged for all the SP products being purchased for all the individual service transactions being aggregated, any suitable description of the time at which all the individual service transactions are being aggregated (e.g., the time of operation 505), and/or the like. Such a stored link or association between such an ASTI (AWOI) and any/all such ISTDs of the individual service transactions being aggregated and any/all such aggregated service transaction details ("ASTDs") may be stored as aggregated service transaction data 555 at SP subsystem 200 (e.g., in table 230) and later used by SP subsystem 200 to validate a request from a CM subsystem for such ISTDs/ASTDs and/or to locate and utilize such ISTDs/ASTDs to generate an appropriate response to such a request. Any suitable second type of condition may be satisfied in order for SP subsystem 200 to store aggregated service transaction data 555 for multiple individual service transactions that have been effected at multiple iterations of operation 502, such once a particular number of individual service transactions have been effected (e.g., 3, 5, 7, 9, etc.), once a particular threshold amount has been reached for the aggregated total amount (to be) charged for all the SP products being purchased for all the individual service transactions being aggregated (e.g., $50, $100, etc.), once a particular threshold duration of time has occurred since an initial service transaction has been effected (e.g., 3 days, 5 days, 7 days, etc.), any suitable dynamic threshold has been satisfied that may be based on a customer's previous transaction history, and/or the like. Therefore, a unique service transaction identifier ("STI") (e.g., a unique web order ID ("WOI")) may be stored against (e.g., along with and/or linked to) any suitable service transaction details ("STDs") that may detail a single individual service transaction (e.g., as individual service transaction data 553) or that may detail a collection of aggregated individual service transactions (e.g., as aggregated service transaction data 555).

At operation 506 of process 500, SP subsystem 200 may generate and communicate transaction authorization request data 556 to CM subsystem 300 in order to attempt to obtain funds from CM subsystem 300 for one or more service transactions effected at operation 502 using a customer transaction credential managed by CM subsystem 300. For example, at any suitable moment after at least one service transaction has been effected at operation 502 using a customer transaction credential managed by CM subsystem 300 and after service transaction data (e.g., data 553 and/or data 555) has been stored for such effected service transaction(s) at operation 503 and/or operation 505, SP subsystem 200 may communicate any suitable transaction authorization request data 556 to CM subsystem 300 in order to request appropriate funds for the effected service transaction(s). Any suitable condition may be satisfied in order for SP subsystem 200 to generate and communicate transaction authorization request data 556 to CM subsystem 300, such as after each individual service transaction has been effected (e.g., after each iteration of operation 502 for effecting an individual service transaction, and after a respective operation 503 for storing individual service transaction data 553 associated with that individual service transaction, SP subsystem 200 may generate and communicate transaction authorization request data 556 to an appropriate CM subsystem 300 that is responsible for the customer transaction credential used to effect that individual service transaction). Alternatively, SP subsystem 200 may generate and communicate transaction authorization request data 556 to CM subsystem 300 only after a particular amount of time (e.g., 2 days, 3 days, 5 days, etc.) has elapsed since an individual service transaction using a particular customer transaction credential has been effected at operation 502, such that an opportunity may be provided for one or more additional service transactions using that particular customer transaction credential to be effected prior to any transaction authorization request data being generated and communicated to CM subsystem 300. Alternatively or additionally, SP subsystem 200 may generate and communicate transaction authorization request data 556 to CM subsystem 300 only after a particular threshold amount of to be collected funds has been reached for a particular customer transaction credential used in one or more individual service transactions (e.g., $50, $100, etc.). Alternatively or additionally, SP subsystem 200 may generate and communicate transaction authorization request data 556 to CM subsystem 300 only after a particular amount of individual service transactions (e.g., 3, 5, 7, etc.) have been effected at operation 502 using a particular customer transaction credential, such that any transaction authorization request data generated and communicated to CM subsystem 300 may be indicative of multiple individual service transactions.

Once any suitable condition has been met by one or more effected service transactions for a customer transaction credential, SP subsystem 200 may generate and communicate any suitable transaction authorization request data 556 representative of such effected service transaction(s) to CM subsystem 300 responsible for that customer transaction credential. When transaction authorization request data 556 is to be communicated for only a single individual service transaction, transaction authorization request data 556 may include not only the unique individual service transaction identifier ("ISTI") (e.g., the unique individual web order ID ("IWOI")) of the individual service transaction data 553 associated with that single individual service transaction, as well as any suitable identifier of SP subsystem 200 making the request, but also any other suitable data that may be useful for CM subsystem 300 to determine whether or not to approve funding the individual service transaction, including, but not limited to, information indicative of the customer transaction credential used at operation 502 to effect the individual service transaction, the amount to be funded (e.g., $10, $20, etc.) for the individual service transaction, and a limited description of the individual service transaction that may be used by CM subsystem 300 for presentation to a customer to identify the transaction (e.g., a payment descriptor field (e.g., a limited length character field (e.g., 20-256 characters))), which may be indicative of a date associated with the transaction (e.g., the date at which the operation 502 effecting the transaction occurred (e.g., "2017-07-01")) and of the SP effecting the transaction (e.g., the name of the SP associated with SP subsystem 200 (e.g., "Gordo's Grocery Store")). Similarly, when transaction authorization request data 556 is to be communicated for multiple individual service transactions that have been aggregated by SP subsystem 200, transaction authorization request data 556 may include not only the unique aggregated service transaction identifier ("ASTI") (e.g., the unique aggregated web order ID ("AWOI")) of the aggregated service transaction data 555 associated with each one of the multiple individual service transactions, as well as any suitable identifier of SP subsystem 200 making the request, but also any other suitable data that may be useful for CM subsystem 300 to determine whether or not to approve funding the aggregated service transaction, including, but not limited to, information indicative of the customer transaction credential used at operation 502 to effect each of the multiple individual service transactions (e.g., "limited transaction credential data," such as any suitable description of the customer transaction credential used to make the purchase (e.g., a hashed version (e.g., last 4 digits) of a credit card number associated with the credential (e.g., "Credential XYZ") or a wallet user identifier (e.g., a user identifier associated with the customer for the credential manager of the credential being used) or the like), the total amount to be funded for the aggregated service transactions (e.g., $55.00 (e.g., a sum of the amount to be funded for each of the individual service transactions that have been aggregated)), and a limited description of the aggregated service transaction that may be used by CM subsystem 300 for presentation to a customer to identify the aggregated transaction (e.g., a payment descriptor field (e.g., a limited length character field (e.g., 20-256 characters))), which may be indicative of a date associated with the aggregated transaction (e.g., the date at which SP subsystem 200 aggregated the individual transactions (e.g., at operation 505 and/or at operation 506)) and of the SP effecting the transaction (e.g., the name of the SP associated with SP subsystem 200 (e.g., "Gordo's Grocery Store")). In some embodiments, the content of such a limited description of the transaction(s) of transaction authorization request data 556, either for a single individual service transaction or for an aggregated service transaction, may be defined to prevent an invasion of the customer's privacy by not including any information that the customer may not want shared with CM subsystem 300 (e.g., information indicative of the one or more SP products being purchased, information indicative of the intended beneficiary of the SP product(s), etc.).

At operation 508 of process 500, CM subsystem 300 may receive and process transaction authorization request data 556 to determine whether or not to fund the transaction associated therewith (e.g., a single individual service transaction or an aggregated service transaction). CM subsystem 300 may identify from the received transaction authorization request data 556 not only the applicable customer transaction credential identifying the CM customer funding account to be used for the funding but also the total amount to be funded. CM subsystem 300 may process such customer transaction credential information and total funding amount information to determine if the customer funding account associated with the customer transaction credential (e.g., a funding account managed by CM subsystem 300) has enough credit or funds or otherwise to cover the total funding amount. If a sufficient amount of funds/credit is determined not to be available at operation 508, then CM subsystem 300 may decline the requested transaction authorization by communicating a negative authorization response to SP subsystem 200 (or an associated acquiring bank thereof) using transaction authorization response data 560 at operation 510 such that SP subsystem 200 may cancel or undo the associated effected service transaction(s). However, if a sufficient amount of funds/credit is determined to be available at operation 508, then CM subsystem 300 may approve the requested transaction authorization by communicating a positive authorization response to SP subsystem 200 (or an associated acquiring bank thereof) using transaction authorization response data 560 at operation 510 such that SP subsystem 200 may be funded for the associated effected service transaction(s).

CM subsystem 300 may be provided by any suitable credential manager and/or combination of suitable credential managers. For example, CM subsystem 300 may include a payment network subsystem and an issuing bank subsystem, which may be a single entity or separate entities. CM subsystem 300 may also include one or more acquiring banks. CM subsystem 300 may include a payment network subsystem (e.g., a payment card association or a credit card association) and/or an issuing bank subsystem. For example, an issuing bank subsystem may be a financial institution that may assume primary liability for a customer's capacity to pay off debts they may incur with a specific customer transaction credential. Each specific customer transaction credential may be associated with a specific payment card that may be electronically linked to an account or accounts of a particular customer or customers. Various types of payment cards may be suitable, including credit cards, debit cards, charge cards, stored-value cards, fleet cards, gift cards, and the like. The customer transaction credential of a specific payment card may be provided to a customer or an electronic device (e.g., device 100) thereof by an issuing bank subsystem of CM subsystem 300 for use in a service transaction with any suitable SP (e.g., in data 552a/552c of operation 502). Each customer transaction credential may be a specific brand of payment card that may be branded by a payment network subsystem of CM subsystem 300. A payment network subsystem may be a network of various issuing banks and/or various acquiring banks that may process the use of customer transaction credentials of a specific brand. For example, American Express may be both a payment network subsystem and an issuing bank subsystem. In contrast, Visa and MasterCard may be payment networks, and may work in cooperation with issuing banks, such as Chase, Wells Fargo, Bank of America, and the like. Although not shown, system 1 (e.g., SP subsystem 200 or CM subsystem 300 or otherwise) may also include an SP acquiring bank. Also known as a payment processor or acquirer, such an SP acquiring bank subsystem may be a banking or credential management partner of the SP associated with SP subsystem 200, and such an SP acquiring bank subsystem may be configured to work with CM subsystem 300 to request (e.g., on behalf of SP subsystem 200) and/or approve and/or settle the funding of credential transactions attempted by a customer with SP subsystem 200. For example, such an SP acquiring bank subsystem may be an intermediary between SP subsystem 200 and CM subsystem 300 for the communication of data 556 and/or data 560 therebetween. Such an SP acquiring bank subsystem may be operative to store or otherwise retain any funds that may be transferred from a customer funding account of CM subsystem 300 in an SP fund account of the SP acquiring bank subsystem on behalf of the SP of SP subsystem 200. Additionally or alternatively to such an SP acquiring bank, any other suitable subsystem (not shown) may be provided as an intermediary for any suitable purpose between SP subsystem 200 and CM subsystem 300 for the communication of data 556 and/or data 560 (and/or any other data, such as data 572 and 578) therebetween, such as middleware or otherwise (e.g., a subsystem provided by Ethoca Inc.) that may reduce the burden on SP subsystem 200 to communicate directly with one or more CM subsystems 300. However, it is understood that, in some embodiments, one, some, or each of such potential intermediaries may be considered a part of SP subsystem 200 as a trusted partner of the SP of SP subsystem 200. One, some, or all components of any acquiring bank subsystem, other intermediary subsystem, payment network subsystem, and/or issuing bank subsystem may be implemented using one or more processor components, which may be the same as or similar to processor 102 of device 100, one or more memory components, which may be the same as or similar to memory component 104 of device 100, and/or one or more communications components, which may be the same as or similar to communications circuitry 114 of device 100.

Moreover, at operation 508 of process 500, CM subsystem 300 may store (e.g., in any suitable memory component accessible to CM subsystem 300) some or all of received transaction authorization request data 556 as well as any suitable status data indicative of the status of the funding of the transaction associated with the transaction authorization request data 556 (e.g., pending, posted (e.g., funded), rejected, etc.) for later use (e.g., for presentation to a customer and/or for requesting further transaction details from SP subsystem 200 (e.g., as described with respect to operations 516-532)). In some embodiments, certain portions of transaction authorization request data 556 communicated from SP subsystem 200 may be manipulated or updated by one or more intermediary subsystems prior to being received by and/or stored by CM subsystem 300. For example, the unique STI/WOI associated with the transaction and provided by transaction authorization request data 556 may be mapped to and replaced by another suitable unique identifier (e.g., an acquire reference number ("ARN")) by an SP acquiring bank subsystem or any other suitable middleware or intermediary during one or more iterations of operations 506-510 for a particular transaction whose funds are being requested, such that the other unique identifier may be received by and stored by CM subsystem 300 instead of or in addition to the unique identifier stored by SP subsystem 200 at operation 503/505 and communicated from SP subsystem 200 at operation 506. However, such another unique identifier, when stored by (e.g., at operation 508) and later used by CM subsystem 300 for requesting additional details from SP subsystem 200 for an associated transaction (e.g., at operation 522), may be mapped to the initial unique identifier known to SP subsystem 200 in any suitable manner (e.g., by an intermediary or by SP subsystem 200 (e.g., in table 230)) for appropriate use by SP subsystem 200 (e.g., at operation 524). For example, a WOI may be any suitable identifier, such as an alphanumeric transaction identifier (e.g., a 10-character alphanumeric identifier (e.g., an SP transaction identifier (e.g., an iTunes' transaction identifier))), while an ARN may be any suitable reference number, such as a numeric identifier (e.g., a 23-digit number to identify a transaction).

At any suitable moment after a transaction has been identified by CM subsystem 300 (e.g., at any suitable moment after CM subsystem 300 may receive transaction authorization request data 556 associated with the transaction at operation 506), a customer of CM subsystem 300 may interface with CM subsystem 300 and be presented with information associated with that transaction by CM subsystem 300. For example, at any suitable moment after operation 506, a customer using electronic device 100 may interface with CM subsystem 300 in any suitable manner (e.g., using any suitable online resource of CM subsystem 300 (e.g., a CM app or internet browser pointed to a CM website or the like) and attempt to authenticate itself as a customer of CM subsystem 300 at operation 512. For example, at operation 512 of process 500, a customer may utilize device 100 to generate and communicate customer authentication data 562 to CM subsystem 300 in an attempt to start an authenticated and active customer session with CM subsystem 300. Customer authentication data 562 may include any suitable customer authentication information that may be provided by device 100 to CM subsystem 300 for use in proving the identity of a trusted customer of CM subsystem 300, including, but not limited to, any suitable customer user name and password combination known to CM subsystem 300, any suitable biometric information of the customer known to CM subsystem 300 (e.g., fingerprint, facial features, voice sample, etc., which, for example, may be captured from the customer by any suitable input component circuitry 108 and/or sensor circuitry 114 of device 100). For example, as shown in FIG. 3A, GUI 180 may provide screen 190a on device 100 (e.g., via touch screen I/O component 109a) to a customer, where the CM online resource may provide a CM interface requesting with information 301 if the customer would like to log-in to the user portal of CM subsystem 300 and enabling the customer to choose "No" with a prompt 303 or "Yes" with a prompt 305, which, when selected, may also include an "Enter Authentication Information" prompt 307 for prompting the customer to enter any applicable customer authentication information (e.g., via any suitable inputs and/or sensors of device 100 or otherwise) that may be used to define at least a portion of customer authentication data 562. At operation 514 of process 500, CM subsystem 300 may process any received customer authentication data 562 (e.g., in conjunction with any predefined customer authentication data available to CM subsystem 300) in an attempt to authenticate the customer's provided authentication information. If CM subsystem 300 is able to authenticate the customer using the received customer authentication data 562, then CM subsystem 300 may also start an active customer session with the authenticated customer at operation 514.

When a customer has been authenticated and an active customer session has been initiated at operation 514, CM subsystem 300 may then generate and communicate authenticated customer option data 566 to the customer's electronic device 100 at operation 516. Electronic device 100 (e.g., using a CM online resource running on device 100) may be configured to process any received authenticated customer option data 566 to present one or more authenticated customer options to the customer at operation 518 based on such authenticated customer option data 566. For example, as shown in FIG. 3B, GUI 180 may provide screen 190b on device 100 (e.g., via touch screen I/O component 109a) to a customer based on receiving an iteration of authenticated customer option data 566, where the CM online resource may provide a CM interface instructing the customer with information 311 to select any suitable available user portal option, such as enabling the customer to choose "View Transaction History" with a prompt 313 or "Pay Bill" with a prompt 315 or "Update User Profile" with a prompt 317, although it is understood that any other suitable options may be presented to an authenticated customer by CM subsystem 300. In response, the customer may select a presented option, such as "View Transaction History" by selecting prompt 315, such that device 100 may generate and communicate appropriate authenticated customer selection data 570 to CM subsystem 300 at operation 520 based on such a customer selection.

When transaction history is requested for presentation by an authenticated customer, continuing with such an example, another iteration of operation 516 may occur in response to CM subsystem 300 receiving customer selection data 570 from the first iteration of operation 520. For example, in response to receiving customer selection data 570 indicative of a customer selecting prompt 315 of screen 190*b* of FIG. 3B for viewing transaction history, CM subsystem 300 may process such customer selection data 570 and then generate and communicate another iteration of authenticated customer option data 566 to the customer's electronic device 100 at another iteration of operation 516 (e.g., based on a CM customer application that may be running at CM subsystem 300) for presenting relevant transaction history associated with the authenticated customer to the authenticated customer via device 100. Electronic device 100 (e.g., using a CM online resource running on device 100) may be configured to process any such received authenticated customer option data 566 to present new authenticated customer options to the customer at another iteration of operation 518 based on such additional authenticated customer option data 566. For example, as shown in FIG. 3C, GUI 180 may provide screen 190*c* on device 100 (e.g., via touch screen I/O component 109*a*) to a customer based on receiving this additional iteration of authenticated customer option data 566, where the CM online resource may provide a CM interface with transaction history information 321 to the customer, where such transaction history information may include any suitable transaction history information associated with at least one customer transaction credential that may be managed by CM subsystem 300 for the authenticated customer, such as "Credential XYZ". As shown, transaction history information 321 for credential XYZ of the authenticated customer may include information indicative of one or more transactions that have been identified by CM subsystem 300 as using credential XYS (e.g., in various iterations of operation 506 with various received instances of transaction authorization request data 556 for various transactions), such as first transaction information 322 that may be indicative of a service transaction with service provider "Gordo's Grocery" on date "2017-07-01" for an amount of "$96.54" whose funds have been "posted" (e.g., provided to the relevant SP), second transaction information 324 that may be indicative of a service transaction with service provider "Mulcahey's Media" on date "2017-07-12" for an amount of "$55.00" whose funds have been "posted", third transaction information 326 that may be indicative of a service transaction with service provider "Forbin's Flowers" on date "2017-07-13" for an amount of "$86.15" whose funds have been "rejected" (e.g., no funds have been or will be provided to the SP for whatever reason), and fourth transaction information 328 that may be indicative of a service transaction with service provider "Tela's Toasters" on date "2017-07-19" for an amount of "$45.11" whose funds are "pending" (e.g., the funds have not yet been but may be provided to the relevant SP). The "Date" and "Service Provider" and "Amount" information that may be provided for each of presented transaction information 322, 324, 326, and 328 of transaction history information 321 may be determined by CM subsystem 300 and used to define option data 566 based on transaction authorization request data 556 stored by CM subsystem at respective iterations of operation 508 for the various respective service transactions.

As mentioned, transaction authorization request data 556 for a particular service transaction provided to CM subsystem 300 by an SP subsystem may include information indicative of the customer transaction credential used to effect the individual service transaction, the amount to be funded for the transaction, and a limited description of the transaction that may be used by CM subsystem 300 for presentation to a customer to identify the transaction (e.g., a payment descriptor field (e.g., a limited length character field (e.g., 20-256 characters))), which may be indicative of a date associated with the transaction and of the SP effecting the transaction, and such information may be used by CM subsystem 300 to at least partially define data 566 for generating transaction history information 321 on device 100. However, such limited description information may be just that, limited, as certain additional details about a transaction or aggregated transactions (e.g., identification of the associated SP product(s) and/or identification of associated beneficiary(ies), and/or identification of associated purchasing customer(s), etc.) may not be provided to CM subsystem 300 by the SP subsystem as a portion of transaction authorization request data 556, but instead may be securely and/or confidentially retained by the SP subsystem and not provided to CM subsystem 300 unless certain security requirements may be met by CM subsystem 300. Therefore, as shown by screen 190*c* of FIG. 3C, transaction history information 321 may also include an instance of an available user portal option to "<see more details>" with a prompt 325 for the transaction associated with second transaction information 324, and/or a similar prompt 327 for the transaction associated with third transaction information 326, and/or a similar prompt 329 for the transaction associated with fourth transaction information 328. Therefore, the potential to obtain and present additional transaction details may be enabled for not only posted transactions but also rejected transactions and/or pending transactions. The ability to provide such an option for a transaction of the transaction history may be determined by CM subsystem 300 based on any suitable information received from the SP subsystem associated with the transaction, such as by a portion of transaction authorization request data 556 that may be received by (e.g., at operation 506) and/or stored by (e.g., at operation 508) CM subsystem 300 for the transaction (e.g., based on the presence of a unique identifier for the transaction within transaction authorization request data 556 (e.g., an STI/WOI/ARN, etc.) and/or based on the presence of a suitable identifier of a particular SP subsystem that is operative to work with CM subsystem 300 to handle the provisioning of more details in a secure manner). In response, the customer may select such a presented option, such as "<see more details>" for the transaction associated with second transaction information 324 by selecting prompt 325, such that device 100 may generate and communicate another iteration of appropriate authenticated customer selection data 570 to CM subsystem 300 at another iteration of operation 520 based on such a customer selection.

When more details about a transaction are requested for presentation by an authenticated customer, such as by selection of prompt 325 of FIG. 3C and communication of appropriate customer selection data 570 to CM subsystem 300 at operation 520, continuing with such an example, CM subsystem 300 may be configured to process such a request of such data 570 and then be configured to generate and communicate appropriate customer receipt request data 572 to an appropriate SP subsystem 200 associated with the transaction at operation 522. For example, CM subsystem 300 may identify SP subsystem 200 as the SP subsystem responsible for the transaction of which additional details have been requested and may identify the unique transaction identifier (e.g., STI/WOI/ARN) stored at CM subsystem 300

(e.g., at operation 508) that is associated with the transaction and may communicate[[d]] that unique transaction identifier to SP subsystem 200 as at least a portion of customer receipt request data 572 at operation 522. CM subsystem 300 may be configured to define customer receipt request data 572 according to any suitable agreed up protocol or arrangement that may have been defined by or agreed upon by SP subsystem 200 in order for CM subsystem 300 to provide SP subsystem 200 with data operative to prove to SP subsystem 200 that an authenticated customer is actively requesting such additional transaction details via a trusted and appropriate CM subsystem. Therefore, while the unique transaction identifier for the transaction as previously provided to CM subsystem 300 may be used in customer receipt request data 572 to identify the appropriate transaction to SP subsystem 200, additional information may be used to define customer receipt request data 572 in order to meet certain requirements of SP subsystem 200 for enabling sharing of the requested transaction details. For example, any suitable additional data may be included in customer receipt request data 572 as may be defined by and communicated from CM subsystem 300 to SP subsystem 200 along with the relevant unique transaction identifier, including, but not limited to, any suitable proof of customer authentication with CM subsystem 300 (e.g., a customer authentication identifier and/or customer session identifier and/or the like that may be used at operation 512 and/or operation 514 to authenticate the customer and initiate an active session for the authenticated customer and/or a time stamp indicative of the initiation of the active session, etc.), any suitable data indicative of the type of authentication data used to authenticate the customer (e.g., the type of customer authentication data 562 used for authentication at operation 514 (e.g., password, biometric, etc.)), any suitable proof of a currently active session with an authenticated customer (e.g., an active session between the customer's device 100 and CM subsystem 300 as started at operation 514 but that has not yet been terminated), any suitable data indicative of the type of electronic device 100 (e.g., iPhone™, iPad™, Macbook™, etc.) being used by the authenticated customer (e.g., as may be determined by CM subsystem 300 by requiring that device 100 share such information (e.g., device identification information 119 of device 100) with CM subsystem 300 (e.g., as a portion of data 562 and/or data 570, etc.)), any suitable description of CM subsystem 300 (e.g., a unique identifier for the CM, such as a bank ID number ("BIN"), and/or a unique IP address and/or unique CM partner ID and/or CM issuer ID and/or the like of CM subsystem 300 (e.g., as may be used at operation 501 for registering CM subsystem 300 with SP subsystem 200), etc.), any suitable information indicative of a location or country of request (e.g., an identifier (e.g., ISO3A code) of the country where the request is initiated (e.g., the country of CM subsystem 300)), and/or the like. Additionally or alternatively, at least a portion of or the entirety of customer receipt request data 572 may be encrypted or encoded or signed or otherwise protected using a shared secret between CM subsystem 300 and SP subsystem 200 (e.g., CM key 157 or the like (e.g., as may be used at operation 501 for registering CM subsystem 300 with SP subsystem 200)).

SP subsystem 200 may receive customer receipt request data 572 from CM subsystem 300 at operation 522 and may then be configured to process such data 572 for authenticating the customer receipt request at operation 524 in any suitable manner. For example, SP subsystem 200 may attempt to authenticate CM subsystem 300 (e.g., the source of the received customer receipt request) using any suitable data, such as by attempting to use a shared secret of SP subsystem 200 and CM subsystem 300 (e.g., as defined during operation 501) to decrypt, decode, unsign, or otherwise process at least a portion of received customer receipt request data 572 (e.g., using CM key 157 of HSM component 290). This may enable SP subsystem 200 to be configured to provide a validation check after receiving customer receipt request data 572 from CM subsystem 300 (e.g., at operation 522) but before sharing any requested details with CM subsystem 300 (e.g., at operation 528). For example, SP subsystem 200 may determine that received customer receipt request data 572 identifies a CM whose CM key 157 has expired or has otherwise been terminated or not recognized by SP subsystem 200 (e.g., by HSM component 290). Therefore, if SP subsystem 200 at some point before operation 528 determines that a particular CM is no longer trustworthy, SP subsystem 200 may remove or otherwise disable its CM key 157 from HSM component 290, such that, when the CM associated with that CM key 157 is later identified by SP subsystem 200 from received customer receipt request data 572 provided by CM subsystem 300, SP subsystem 200 may not provide any requested details, thereby preventing the desired detailing. Alternatively, a CM identified by customer receipt request data 572 received by SP subsystem 200 may never have had a CM key 157 registered with SP subsystem 200, such that SP subsystem 200 may realize that customer receipt request data 572 may be an attempt to access transaction details by a CM or otherwise that is not recognized by SP subsystem 200 and, thus, SP subsystem 200 may prevent the authentication of the customer receipt request from being carried out. However, if CM subsystem 300 is able to be authenticated at operation 524 by SP subsystem 200, SP subsystem 200 may be satisfied that the receipt request is being made by a known and trusted CM (e.g., due to shared secret information CM key 157). Additionally or alternatively, any other suitable data of customer receipt request data 572 may be processed by SP subsystem 200 at operation 524 to attempt to authenticate the customer receipt request, including, but not limited to, any suitable proof of customer authentication with CM subsystem 300 (e.g., a customer authentication identifier and/or customer session identifier and/or the like that may be used at operation 512 and/or operation 514 to authenticate the customer and initiate an active session for the authenticated customer and/or a time stamp indicative of the initiation of the active session, etc.), any suitable data indicative of the type of authentication data used to authenticate the customer (e.g., the type of customer authentication data 562 used for authentication at operation 514 (e.g., password, biometric, etc.)), any suitable proof of a currently active session with an authenticated customer (e.g., an active session between the customer's device 100 and CM subsystem 300 as started at operation 514 but that has not yet been terminated), any suitable data indicative of the type of electronic device 100 (e.g., iPhone™, iPad™, Macbook™, etc.) being used by the authenticated customer, any suitable description of CM subsystem 300 (e.g., a unique identifier for the CM, such as a bank ID number ("BIN"), and/or a unique IP address and/or unique CM partner ID and/or CM issuer ID and/or the like of CM subsystem 300 (e.g., as may be used at operation 501 for registering CM subsystem 300 with SP subsystem 200), etc.), and/or the like.

In order to strengthen the authentication of operation 524, a CM subsystem may be configured to generate a unique verification code ("VC") in response to receipt of a customer's selection to access more details for a particular transaction, and the CM subsystem may then store that VC against any suitable data indicative of the particular transaction, and then include that VC as at least a portion of customer receipt request data to be authenticated by an SP subsystem. For example, as shown in FIG. 5, in response to CM subsystem 300 receiving customer selection data 570 indicative of user selection of prompt 325 to "<see more details>" for the transaction associated with second transaction information 324, process 500 may also include an operation 521, at which CM subsystem 300 may be configured to generate any suitable verification code identifier data 571 and then store such data 571 against any suitable VC transaction data (e.g., VC transaction data 574b) indicative of the particular transaction identified by the received customer selection data 570, where such a stored link may be stored in any suitable storage component or table or otherwise accessible to CM subsystem 300 or an associated partner. Verification code identifier data 571 may include any suitable numeric or alphanumeric or other suitable type of identifier (e.g., a unique and/or random and/or one-time authentication or verification code or token (e.g., as may be generated in any suitable manner by CM subsystem 300)) that may be associated with the customer session activated at operation 514 and/or associated with a transaction identifier of the received customer selection data 570 (e.g., a unique transaction identifier (e.g., STI/WOI/ARN)). Then, also at operation 521, such verification code identifier data 571 may be stored against or otherwise linked to the transaction identifier of the selected transaction and/or to any suitable limited transaction credential data (e.g., VC transaction data 574b) for that transaction (e.g., as received as data 556 at operation 506), such as any suitable description of the customer transaction credential used to make the purchase (e.g., a hashed version (e.g., last 4 digits) of a credit card number associated with the credential (e.g., "Credential XYZ") or a wallet user identifier (e.g., a user identifier associated with the customer for the credential manager of the credential being used) or the like). A new VC may be generated for every new customer selection of prompt 325 to "<see more details>". In such embodiments, process 500 may also include operations 524a-524d that may be combined with operation 524 to strengthen the authentication of the customer receipt request.

When process 500 includes operation 521, CM subsystem 300 may be operative to include verification code identifier data 571 as a portion of customer receipt request data 572 communicated to SP subsystem 200 at operation 522. Then, in response to receiving such customer receipt request data 572, SP subsystem 200 may authenticate CM subsystem 300 (e.g., authenticate the source of the received customer receipt request data 572) and may detect verification code identifier data 571 in the received customer receipt request data 572. If SP subsystem 200 authenticates CM subsystem 300 and identifies verification code identifier data 571 at operation 524, then SP subsystem 200 may generate and communicate any suitable verification code request data 574a to CM subsystem 300 at operation 524a. Such verification code request data 574a may include the verification code identifier data 571 identified in the received customer receipt request data 572 at operation 524 and may be addressed to CM subsystem 300 using any suitable data from the received customer receipt request data 572 (e.g., using a CM partner ID and/or CM issuer ID and/or the like of data 572). Verification code request data 574a may be operative to request that CM subsystem 300 verify and/or validate that it is the source of the verification code identifier data 571 included in the verification code request data 574a (e.g., to prevent customer receipt request data 572 from being spoofed by an entity other than CM subsystem 300).

At operation 524b, CM subsystem 300 may (i) receive verification code request data 574a, (ii) detect verification code identifier data 571 from verification code request data 574a, (iii) determine if that detected verification code identifier data 571 was previously stored by CM subsystem 300 (e.g., at operation 521), and, if so, (iv) determine whether the customer session associated with that stored verification code identifier data 571 is still active, and, if so, (v) identify any suitable VC transaction data 574b (e.g., a unique transaction identifier and/or a hashed version (e.g., last 4 digits) of a credit card number associated with the credential (e.g., "Credential XYZ") and/or a wallet user identifier (e.g., a user identifier associated with the customer for the credential manager of the credential being used) and/or the like) that was previously stored against that stored verification code identifier data 571 (e.g., at operation 521). If operation 524b is successful, then CM subsystem 300 may then communicate verification code response data 574c to SP subsystem 200 at operation 524c, where verification code response data 574c may include a notification that the customer session associated with verification code identifier data 571 is still active and/or any suitable portion of VC transaction data 574b (e.g., any suitable data for the particular transaction that may be stored by CM subsystem 300 against verification code identifier data 571, such as a unique transaction identifier (e.g., STI/WOI/ARN) and/or any suitable limited transaction credential data (e.g., VC transaction data 574b) for that transaction (e.g., any suitable description of the customer transaction credential used to make the purchase (e.g., a hashed version (e.g., last 4 digits) of a credit card number associated with the credential (e.g., "Credential XYZ")) or a wallet user identifier (e.g., a user identifier associated with the customer for the credential manager of the credential being used) or the like))).

In response to receiving such verification code response data 574c from CM subsystem 300, SP subsystem 200 may validate that verification code response data 574c at operation 524d in any suitable manner. For example, in response to SP subsystem 200 receiving verification code response data 574c indicating that CM subsystem 300 did indeed source the verification code identifier data 571 of request data 574a and that the associated customer session is still active, SP subsystem 200 may obtain the VC transaction data 574b from verification code response data 574c and validate that VC transaction data 574b using any suitable data available to SP subsystem 200, including customer receipt request data 572 and/or service transaction data 553/555. As just one example, SP subsystem 200 may authenticate customer receipt request data 572 at operation 524d if SP subsystem 200 is able to extract a unique transaction identifier (e.g., an STI/WOI/ARN) from VC transaction data 574b and identify that same unique transaction identifier in customer receipt request data 572. As another example, SP subsystem 200 may authenticate customer receipt request data 572 at operation 524d if SP subsystem 200 is able to (i) identify a unique transaction identifier (e.g., STI/WOI/ARN) from the received customer receipt request data 572 and (ii) identify that same unique transaction identifier stored at SP subsystem 200 (e.g., in table 230) as well as any suitable service transaction details ("STDs") that may be stored against that unique transaction identifier (e.g., in table 230), for example, as may have been previously stored by SP subsystem 200 at operation 503 and/or operation 505, and then (iii) determine that any data of such STDs match any of the VC transaction data 574b received in data 574c. That is, SP subsystem 200 may authenticate customer receipt request data 572 at operation 524d if a unique transaction identifier from customer receipt request data 572 has been stored at SP subsystem 200 (e.g., at operation 503 or 505) against any transaction credential data that is also identified by VC transaction data 574b of received VC response data 574c (e.g., any suitable description of the customer transaction credential used to make the purchase (e.g., a hashed version (e.g., last 4 digits) of a credit card number associated with the credential (e.g., "Credential XYZ")) or a wallet user identifier (e.g., a user identifier associated with the customer for the credential manager of the credential being used) or the like). Therefore, operations 521 and 524a-524d may provide robust processes for authenticating customer receipt request data 572. Operations 524a-524d may require a separate call-back routine that links a VC and WOI of an initial request (e.g., of data 572) with an STD (e.g., VC transaction data) of a VC response (e.g., of data 574c) and with a WOI and STD of stored SP transaction data (e.g., of data 553/555). A VC of CR request data 572, as received by SP subsystem 200, may be used by SP subsystem 200 to request and receive VC transaction data 574b from CM subsystem 300 that may include an STD (e.g., last 4 digits of credential and/or a wallet user ID) associated with a WOI of CR request data 572, and then SP subsystem 200 may use the STD of VC transaction data 574b and the WOI of CR request data 572 to further authenticate the request through successful comparison of such data against any WOI and STD data of stored STD data 553/555. In some embodiments, if customer receipt request data 572 includes a WOI type unique transaction identifier, operation 524d may include SP subsystem 200 checking if any parsing may be useful to ensure that the WOI is identified correctly. In some other embodiments, if customer receipt request data 572 includes an ARN type unique transaction identifier, operation 524d may include SP subsystem 200 performing a look-up to an ARN-WOI table (e.g., independently or using an intermediary partner) to obtain the proper WOI.

If the customer receipt request of customer receipt request data 572 is not able to be authenticated by SP subsystem 200 for any reason at one or more of operations 524 and 524a-524d, SP subsystem 200 may generate and communicate any suitable message to CM subsystem 300 (e.g., as data 578 at operation 528) that may be indicative of that failure and/or that may be operative to instruct CM subsystem 300 to communicate suitable data to device 100 (e.g., data 582 at operation 532) for presenting any suitable information to the customer (e.g., at operation 534), where such information may be operative to instruct the customer to contact SP subsystem 200 directly for the desired additional transaction details (e.g., a message that may state "please log-in to Mulcahey's Media's website to access the additional details"). Alternatively, if the customer receipt request of customer receipt request data 572 is able to be authenticated by SP subsystem 200 at one or more of operations 524 and 524a-524d, SP subsystem 200 may then obtain an appropriate customer receipt 576 at operation 526 that may be shared with a customer via CM subsystem 300. For example, at operation 526, SP subsystem 200 may be operative to identify a unique transaction identifier (e.g., STI/WOI/ARN) from the received and authenticated customer receipt request data 572 and may then attempt to identify that same unique transaction identifier stored at SP subsystem 200 (e.g., in table 230) as well as any suitable service transaction details ("STDs") that may be stored against that unique transaction identifier (e.g., in table 230), for example, as may have been previously stored by SP subsystem 200 at operation 503 and/or operation 505. In some embodiments, if authenticated customer receipt request data 572 includes a WOI type unique transaction identifier, operation 526 may include SP subsystem 200 checking if any parsing may be useful to ensure that the WOI is identified correctly in order to be used to identify the proper STDs. In some other embodiments, if authenticated customer receipt request data 572 includes an ARN type unique transaction identifier, operation 526 may include SP subsystem 200 performing a look-up to an ARN-WOI table (e.g., independently or using an intermediary partner) to obtain the proper WOI to be used to identify the proper STDs. When such STDs are identified at operation 526, SP subsystem 200 may then use at least a portion of such STDs to generate or obtain customer receipt 576.

For example, customer receipt 576 may be defined as an image file (e.g., a tagged image file format ("TIFF") image file, or the like) that may convert text data into an image file that may then not be easily utilized (e.g., by CM subsystem 300) to digitally recover or access the text data, thereby providing a layer of security and confidentiality to the underlying textual information of receipt 576. For example, the STDs stored at SP subsystem 200 (e.g., at operation 503 and/or 505) may be identified and provided at operation 526 as text information in an HTML link, which may then be converted into an image file format. Additionally, in some embodiments, information indicative of the type of electronic device 100 (e.g., iPhone™ iPad™, Macbook™, etc.) being used by the authenticated customer of the active session with CM subsystem 300 (e.g., as may be identified by SP subsystem 200 in customer receipt request data 572) may be used by SP subsystem 200 at operation 526 to generate customer receipt 576 as an image file that may be optimized for that particular device type (e.g., the resolution and/or size and/or file type for customer receipt 576 may be determined by SP subsystem 200 at least partially based on such a device type). If the customer receipt request of customer receipt request data 572 is authenticated by SP subsystem 200 at operation 524, and if customer receipt 576 is obtained by SP subsystem 200 at operation 526, then SP subsystem may generate and communicate customer receipt response data 578 that may include customer receipt 576 (e.g., an image format file) to CM subsystem 300 at operation 528. In some embodiments, data 578 may be encrypted, encoded, signed, or otherwise manipulated by a shared secret between SP subsystem 200 and CM subsystem 300 (e.g., with CM key 157) for providing additional security to receipt 576 of data 578 when in transit to CM subsystem 300 (e.g., such that CM subsystem 300 may authenticate the source of receipt response data 578 and, thus, customer receipt 576). In response to receiving receipt 576 of data 578 at operation 528 (e.g., when authenticated), CM subsystem 300 may generate a customer receipt presentation 580 with customer receipt 576 at operation 530 and then generate and communicate customer receipt presentation data 582 including customer receipt presentation 580 to device 100 at operation 532, such that, when received by device 100, device 100 may present customer receipt presentation 580 including customer receipt 576 to the customer at operation 534 (e.g., as shown in screen 190d of FIG. 3D).

Alternatively, rather than providing the receipt as an image file, the receipt content may be defined by SP subsystem 200 and used to populate a web container or servlet container or iframe or any other suitable component or interface portion (e.g., pop-up page) of an online resource of CM subsystem 300. For example, CM subsystem 300 may define a URL that may be pointed to by a web container presented by CM subsystem 300 to a user of device 100, and then SP subsystem 200 may control what content is associated with that URL and displayed within the web container presented by CM subsystem 300. For example, CM subsystem 300 may be configured to communicate a particular URL or other web container address to SP subsystem 200 as at least a portion of data 572 at operation 522, where that URL may include any suitable information of data 572, such as data indicative of a domain managed by SP subsystem 200 (e.g., "https://SPsubsystem200.com/receipts/") as well as VC identifier data 571 (e.g., a one-time code or token) as well as an identifier of CM subsystem 300 (e.g., a Partner ID) as well as a unique transaction identifier for the transaction at issue (e.g., an STI/WOI/ARN), where such a URL may read as "https://SPsubsystem200.com/receipts/VCabc_PartnerIDdef_WOIghi". Then, after successful authentication at operation 524 and/or operations 524a-524d, and then after the STDs stored at SP subsystem 200 (e.g., at operation 503 and/or 505) may be identified and provided at operation 526 as text information or other suitable content of receipt 576 in an HTML link, for example, that content of receipt 576 may be used as data 578 to define the content populating the target of the URL (e.g., a servlet to which is mapped the URL) of the web container of CM subsystem 300 (e.g., at operation 528). In such embodiments, CM subsystem 300 may generate a customer receipt presentation 580 (e.g., at operation 530 or, perhaps, earlier (e.g., at operation 522)) that includes the web container associated with the URL (e.g., the URL that may be mapped to the content of receipt 576 at operation 528). This may enable customer receipt presentation data 582 including customer receipt presentation 580 to be provided to device 100 at operation 532, such that, when received by device 100, device 100 may present customer receipt presentation 580 including customer receipt 576 to the customer at operation 534 (e.g., as shown in screen 190d of FIG. 3D).

For example, as shown in FIG. 3D, GUI 180 may provide screen 190d on device 100 (e.g., via touch screen I/O component 109a) to a customer based on receiving customer receipt presentation data 582, where the CM online resource may provide to the customer a CM interface of an SP customer receipt interface 331 (e.g., as a pop-up interface or web container or otherwise on top of transaction history information 321 or as a standalone interface or otherwise), where such SP customer receipt interface 331 may be customer receipt 576 (e.g., the image file or web container content obtained at operation 526 and communicated at operation 528), which may include any suitable service transaction details ("STDs") that may have been stored by SP subsystem 200 for the service transaction of interest (e.g., at operation 503 and/or operation 505). For example, as shown, SP customer receipt interface 331 may include a header interface region 333 with certain STD information, including, but not limited to, any suitable description of the customer transaction credential used for the transaction (e.g., "Billed To: Credential XYZ"), any suitable description of the amount charged or to be charged or requested to be charged for the transaction (e.g., "Total Amount: $55.00"), any suitable description of the time at which the STDs were stored by SP subsystem 200 (e.g., "Date: 2017 Jul. 12"), any suitable description of a customer identifier of a customer account at SP subsystem 200 of the customer that effected the transaction (e.g., "Service Provider User ID: ABC"), any suitable description of the unique identifier associated with the transaction (e.g., "Transaction ID: ZZYZX" (e.g., an STI, WOI, ARN, or the like)), any suitable description of the SP of SP subsystem 200 (e.g., "Mulcahey's Media"), and/or the like. Additionally, as shown, SP customer receipt interface 331 may include at least one set of details for at least one individual service transaction, such as individual service transaction details 335, which, as shown, may include any suitable description of the time at which the individual service transaction was effected (e.g., the time of operation 502 associated with the individual service transaction (e.g., 2017-07-09)), any suitable description (e.g., text, graphics, etc.) of the SP product being purchased for the individual service transaction (e.g., "Movie DEF")), any suitable description of the customer and/or customer's device used to make the purchase for the individual service transaction (e.g., "Wife's Phone"), any suitable description of the amount associated with the individual service transaction (e.g., "$20.00"), and/or any other suitable STD(s) that may be associated with the individual service transaction.

As mentioned (e.g., with respect to operation 505), a transaction may be an aggregate transaction of multiple individual transactions, in which case SP customer receipt interface 331 may include at least one additional set of details for at least one additional individual service transaction that may have been aggregated with the individual service transaction represented by details 335, such as individual service transaction details 336, which, as shown, may include any suitable description of the time at which the individual service transaction was effected (e.g., the time of operation 502 associated with the individual service transaction (e.g., 2017-07-10)), any suitable description (e.g., text, graphics, etc.) of the SP product being purchased for the individual service transaction (e.g., "Movie GHI")), any suitable description of the customer and/or customer's device used to make the purchase for the individual service transaction (e.g., "Son's Tablet"), any suitable description of the amount associated with the individual service transaction (e.g., "$20.00"), and/or any other suitable STD(s) that may be associated with the individual service transaction, and/or such as individual service transaction details 337, which, as shown, may include any suitable description of the time at which the individual service transaction was effected (e.g., the time of operation 502 associated with the individual service transaction (e.g., 2017-07-12)), any suitable description (e.g., text, graphics, etc.) of the SP product being purchased for the individual service transaction (e.g., "Album JKL")), any suitable description of the customer and/or customer's device used to make the purchase for the individual service transaction (e.g., "Wife's Phone"), any suitable description of the amount associated with the individual service transaction (e.g., "$15.00"), and/or any other suitable STD(s) that may be associated with the individual service transaction. Therefore, in some embodiments, as shown in FIG. 3D, customer receipt 576 (e.g., as presented by SP customer receipt interface 331) may be generated based on STDs associated with an aggregated service transaction as may be stored as data 555 at operation 505. Alternatively, customer receipt 576 may be generated based on STDs associated with only an individual service transaction as may be stored as data 553 at operation 503. It is understood that the entire content of SP customer receipt interface 331 (e.g., as presented to a customer on device 100 via CM subsystem 300 at operation 534) may be defined by customer receipt 576, as may be generated by SP subsystem 200 at operation 526, and the content of SP customer receipt interface 331 (e.g., the details of details 333, 335, 336, and 337) may not be affected and/or accessed by CM subsystem 300. Although not shown, the content of customer receipt 576 may include credit notes that SP subsystem 200 may have issued for customer refunds. It is to be understood that any suitable type of content of customer receipt 576 may be at least partially masked so as not to be clearly presented by SP customer receipt interface 331. For example, a customer identifier of a customer account at SP subsystem 200 of the customer that effected the transaction (e.g., "Service Provider User ID: ABC") may be at least partially masked (e.g., only the first 3 letters of an e-mail address and the e-mail domain may be displayed for an e-mail user ID). As another example, a description of the customer transaction credential used for the transaction (e.g., "Billed To: Credential XYZ") may be at least partially masked (e.g., a customer name and street address may be fully masked, and only a customer's city, state, and zip code may be fully displayed).

As also shown in FIG. 3D, SP customer receipt interface 331 may also include an instance of an available user portal option to "[close]" the SP customer receipt interface 331 with a prompt (e.g., radio button) 338, which, when selected may close or otherwise terminate the presentation of SP customer receipt interface 331 on device 100. Moreover, in some embodiments, at operation 536 of process 500, at any moment after customer receipt presentation data 582 including customer receipt 576 is communicated from CM subsystem 300 to user device 100 at operation 532, CM subsystem 300 may be configured to discard (e.g., permanently delete) customer receipt 576 and/or customer receipt presentation 580 and/or any other suitable data that may be indicative of any of the additional transaction details (e.g., STDs) shared by SP subsystem 200 with CM subsystem 300 in data 578 at operation 528 (e.g., as an image file). Therefore, if an authenticated customer session is terminated and/or the customer closes SP customer receipt interface 331 (e.g., using prompt 338), then the customer may have to repeat portions of process 500 to re-request the additional transaction details. Moreover, in some embodiments, at operation 535 of process 500, at any moment after customer receipt response data 578 (e.g., including customer receipt 576 or an error message) is shared by SP subsystem 200 at operation 528 for use in presentation 580, SP subsystem 200 may be configured to create and share any suitable independent customer alert data 585 with any appropriate customer at operation 535 (e.g., via e-mail) to directly notify the customer of any receipt request handled by SP subsystem 200.

Any suitable API(s) may be used between any two communicating entities of system 1. SP subsystem 200 may call an API endpoint with an authorization request of data 566 to retrieve a current funding state or status of a transaction, and the API response to the call may be the response of response data 560 from CM subsystem 300. Additionally or alternatively, CM subsystem 300 may call an API endpoint with a customer receipt request of data 572 (e.g., data with a receipt URL for a web container) to retrieve a customer receipt for a transaction, and the API response to the call may be the customer receipt of response data 578 from SP subsystem 200 (e.g., HTML content for populating the web container). In some embodiments, some or all data communicated between SP subsystem 200 and CM subsystem 300 and/or any intermediary subsystem(s) may be communicated inside a file of any suitable type and/or structure, such as a JavaScript Object Notation ("JSON") file or dictionary, where string encoding may be carried out in any suitable manner, such as UTF-8 string encoding. In some embodiments, a particular key, such as a "statusCode" key, may be an optional key that may be defined within a response header (e.g., a response header JSON data structure) that may be included in one, some, or each API response. If a request was successfully processed and no errors occurred, then such a "statusCode" key may not be included in the response header. However, if such a "statusCode" key is present in a response header, the receiving server may be operative to determine that it need not parse the remainder of the data (e.g., the remainder of the JSON data structure).

It is understood that the operations shown in process 500 of FIG. 5 are only illustrative and that existing operations may be modified or omitted, additional operations may be added, and the order of certain operations may be altered. For example, one, some, or each of operations 512-536 may occur during and/or after operation 508 but before operation 510 (e.g., before the funding status of a transaction has been resolved (e.g., posted and/or shared with SP subsystem 200). Although, in some embodiments, CM subsystem 300 may not be enabled to generate an authenticatable customer receipt request (e.g., at operation 522) unless an authenticated customer during an active session with CM subsystem 300 actively requests a detailed customer receipt (e.g., by selecting prompt 325 of screen 190c), it is understood that, in other embodiments, a customer may not actively request the additional details (e.g., by selecting prompt 325), but instead CM subsystem 300 may be configured to automatically request and receive customer receipt 576 (e.g., at operations 522-528) whenever an authenticated and active customer session is underway and the customer's transaction history includes a transaction with additional details available (e.g., such that the additional details may be automatically presented to the customer without requiring the customer to actively request them). Although customer receipt 576 has been described, at least in some embodiments, as being shared with CM subsystem 300 in an image file format, it is understood that, in some other embodiments, customer receipt 576 may be provided by SP subsystem 200 to CM subsystem 300 in any other suitable format, such as in an audio file format that may be presented audibly to a customer via an audio output component of device 100 (e.g., audio output component 110b), or in a text file format, whether or not such a format may provide any restrictions with respect to its use and/or retention by the CM subsystem.

Therefore, SP subsystem 200 and CM subsystem 300 may be configured to provide a new layer of security and/or to provide a more seamless user experience when certain additional details regarding one or more service transactions are requested by a customer via a credential manager. After a customer (e.g., user of device 100) may provide a request for additional transaction details (e.g., by selecting prompt 325 of screen 190c of FIG. 3C at an iteration of operation 520), operations 520-536 may occur transparent to the customer. That is, once the customer provides intent to receive additional details, some or each of operations 520-536 may occur without any further customer interaction and may seem instantaneous to the customer, whereby process 500 may appear to a user as if, after requesting additional transaction details, such details are automatically and instantaneously presented to the customer at operation 534. For example, system 1 may be configured such that operation 534 may occur within less than 2 seconds and, more particularly, within less than 1 second, or within less than 500 milliseconds, or within less than 100 milliseconds of operation 520, for providing a customer experience that may seem as if customer receipt 576 of customer receipt presentation 580 were available to device 100, or at least to CM subsystem 300, prior to operation 520.

Therefore, process 500 may enable a customer to request and receive further transaction details (e.g., on-demand or automatically in real-time) during an authenticated and active session with a CM subsystem (e.g., using an online resource of the CM). Such further transaction details may be presented to the customer via the CM subsystem (e.g., using an online resource of the CM) but in a format defined and controlled by the SP subsystem associated with the transaction (e.g., in a format typical for that SP (e.g., in a typical iTunes purchase receipt format that may otherwise be provided to the customer when interfacing directly with the SP)). The transaction details may be provided to the CM subsystem by the SP subsystem in a manner that may prevent or reduce the ability of the CM subsystem to determine or retain information indicative of the details, which may be private details intended to remain in confident between the SP and the customer. This may be especially useful for a transaction presented by the CM subsystem that is actually an aggregation of multiple individual service transactions by the SP subsystem (e.g., where the transaction amount and/or date that may be initially presented by the CM subsystem for such an aggregated transaction (e.g., by second transaction information 324 of screen 190c) may be confusing to a customer because the amount may be representative of an aggregated sum and/or because the date may be representative of the end of a time period during which individual transactions were aggregated), such that the provided additional details may enable a customer to determine more easily what individual service transactions are represented by the aggregated transaction. This can provide better clarity of the charges presented to customers by credential managers, significantly reduce customers' confusion over certain charges, reduce call volume to both service providers and credential managers, and reduce service providers' chargeback volume. Various requirements may be enforced by an SP in order to enable a CM to provide such a service to a customer (e.g., to authenticate a CM's receipt request), including, but not limited to, requiring registration between the CM and SP (e.g., to create and manage a shared secret), requiring proof of an active and/or authenticate customer session with the CM, requiring a separate call-back routine that links a VC and WOI of an initial CM request with an STD of a VC response and SP-stored transaction data, requiring the CM to properly dispose of any shared details after appropriate presentation to the customer (e.g., such that the additional transaction details of a customer receipt may not be accessed by and/or retained by the CM subsystem beyond the intended functionality of presenting the receipt to the customer), and/or the like.

Figure 6:
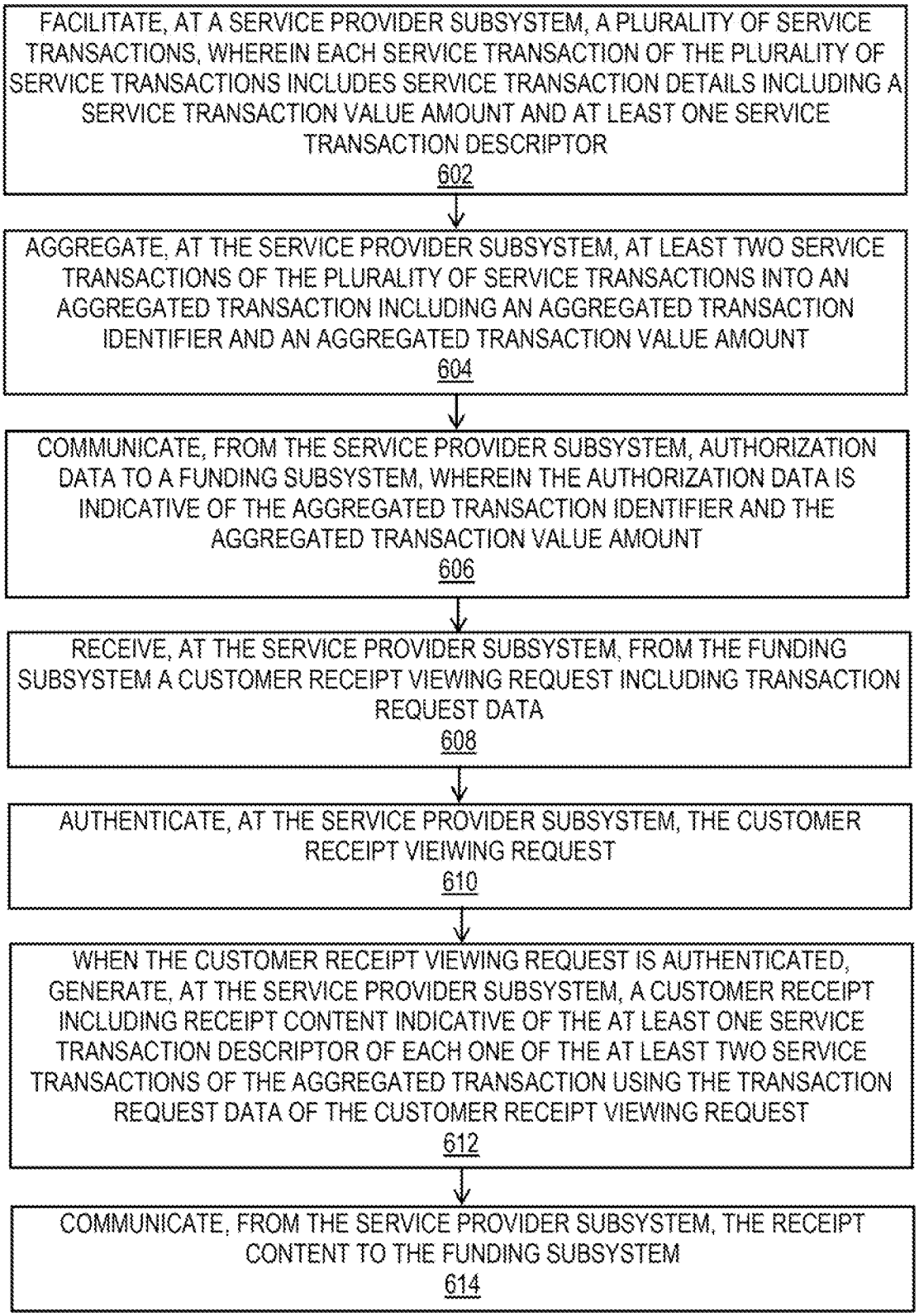

Description of FIG. 6

FIG. 6 is a flowchart of an illustrative process 600 for managing transactions in a system including a service provider subsystem and a funding subsystem. At operation 602 of process 600, the service provider subsystem may facilitate a plurality of service transactions, wherein each service transaction of the plurality of service transactions includes service transaction details including a service transaction value amount and at least one service transaction descriptor (e.g., as described at least with respect to operation 502 of process 500). At operation 604 of process 600, the service provider subsystem may aggregate at least two service transactions of the plurality of service transactions into an aggregated transaction including an aggregated transaction identifier and an aggregated transaction value amount (e.g., as described at least with respect to operation 505 of process 500). At operation 606 of process 600, the service provider subsystem may communicate authorization data to the funding subsystem, wherein the authorization data is indicative of the aggregated transaction identifier and the aggregated transaction value amount (e.g., as described at least with respect to operation 506 of process 500). At operation 608 of process 600, the service provider subsystem may receive from the funding subsystem a customer receipt viewing request including transaction request data (e.g., as described at least with respect to operation 522 of process 500). At operation 610 of process 600, the service provider subsystem may authenticate the customer receipt viewing request (e.g., as described at least with respect to operation 524 and/or operations 524a-524d of process 500). At operation 612 of process 600, when the customer receipt viewing request is authenticated, the service provider subsystem may generate a customer receipt including receipt content indicative of the at least one service transaction descriptor of each one of the at least two service transactions of the aggregated transaction using the transaction request data of the customer receipt viewing request (e.g., as described at least with respect to operation 526 of process 500). At operation 614 of process 600, the service provider subsystem may communicate the receipt content to the funding subsystem (e.g., as described at least with respect to operation 528 of process 500).

It is understood that the operations shown in process 600 of FIG. 6 are only illustrative and that existing operations may be modified or omitted, additional operations may be added, and the order of certain operations may be altered.

Figure 7:
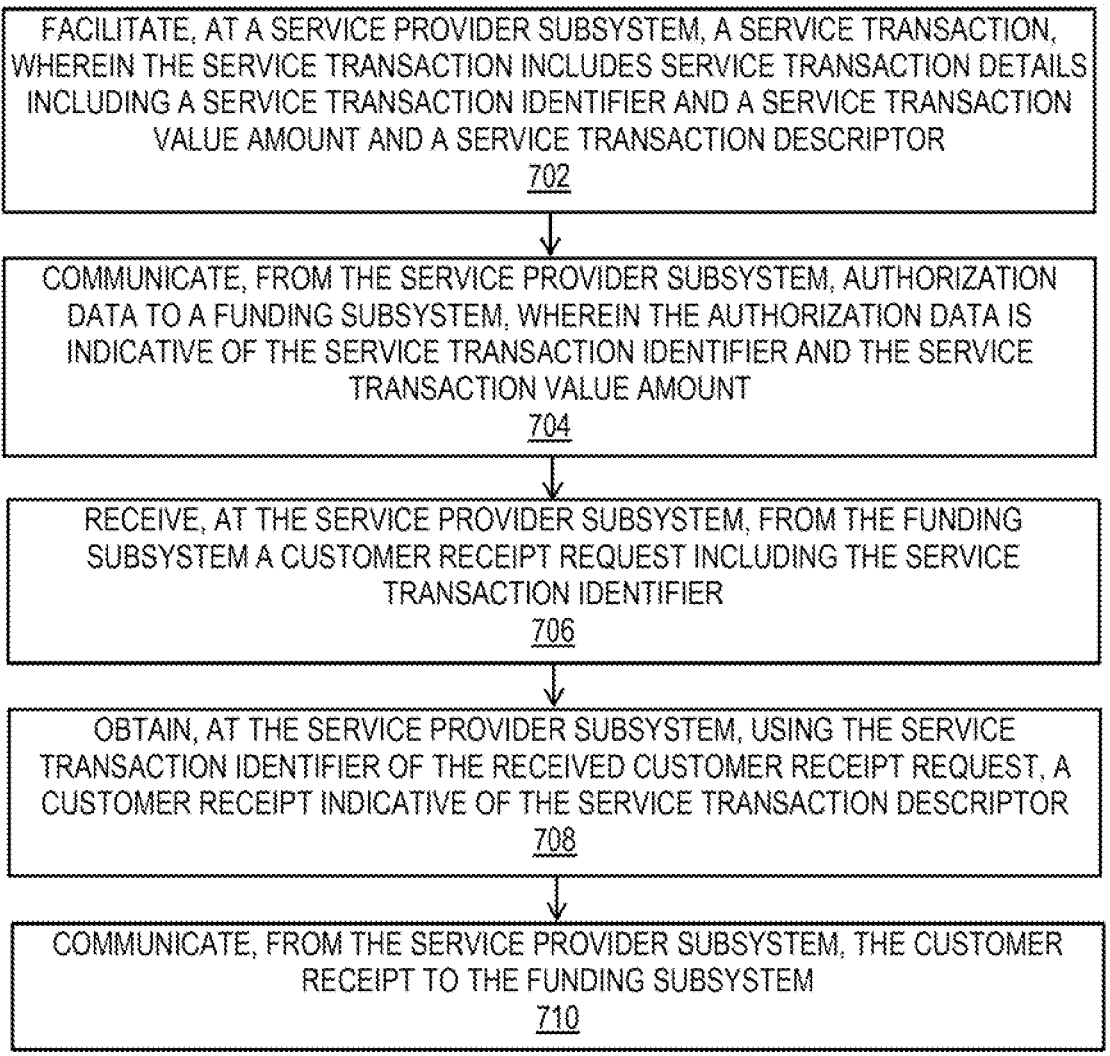

Description of FIG. 7

FIG. 7 is a flowchart of an illustrative process 700 for managing transactions in a system including a service provider subsystem and a funding subsystem. At operation 702 of process 700, the service provider subsystem may facilitate a service transaction, wherein the service transaction includes service transaction details including a service transaction identifier and a service transaction value amount and a service transaction descriptor (e.g., as described at least with respect to operation 502 of process 500). At operation 704 of process 700, the service provider subsystem may communicate authorization data to the funding subsystem, wherein the authorization data is indicative of the service transaction identifier and the service transaction value amount (e.g., as described at least with respect to operation 506 of process 500). At operation 706 of process 700, the service provider subsystem may receive from the funding subsystem a customer receipt request including the service transaction identifier (e.g., as described at least with respect to operation 522 of process 500). At operation 708 of process 700, the service provider subsystem may obtain, using the service transaction identifier of the received customer receipt request, a customer receipt indicative of the service transaction descriptor (e.g., as described at least with respect to operation 526 of process 500). At operation 710 of process 700, the service provider subsystem may communicate the customer receipt to the funding subsystem (e.g., as described at least with respect to operation 528 of process 500).

It is understood that the operations shown in process 700 of FIG. 7 are only illustrative and that existing operations may be modified or omitted, additional operations may be added, and the order of certain operations may be altered.

Figure 8:
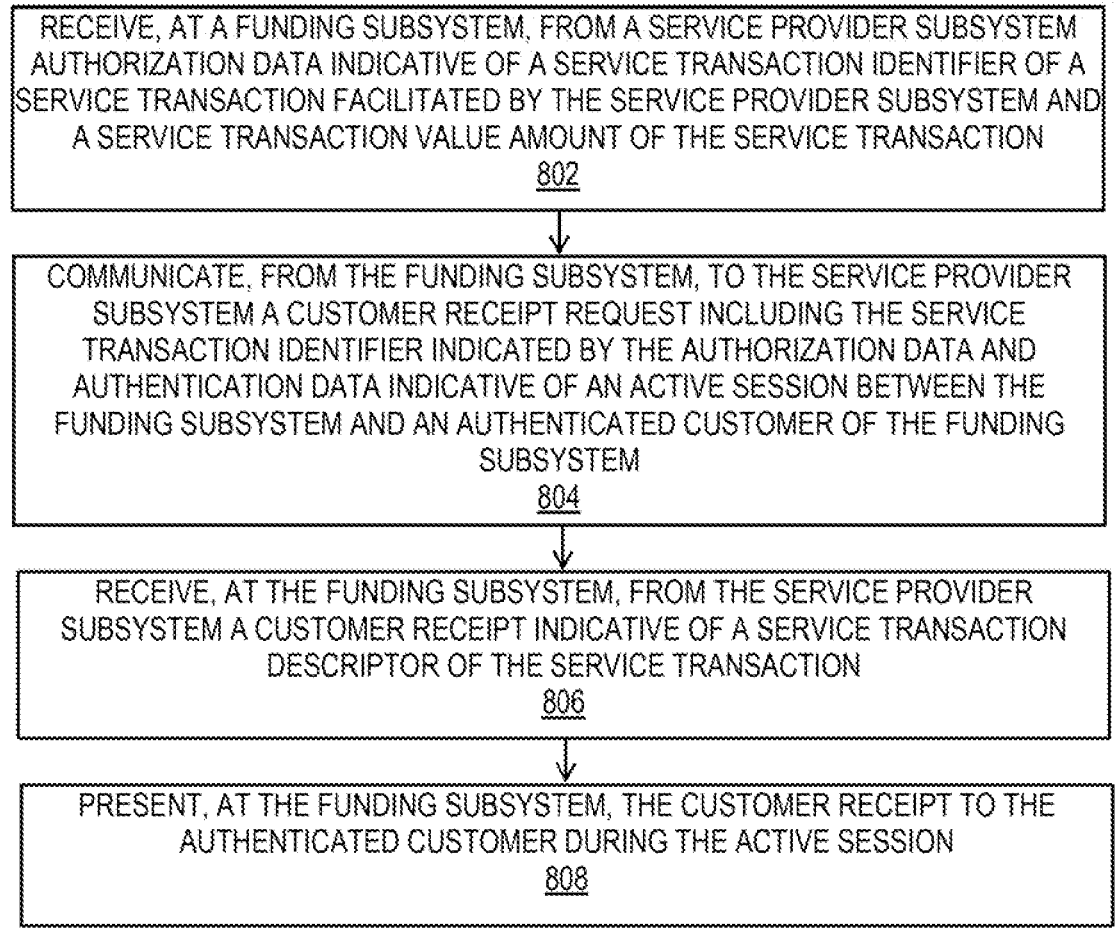

Description of FIG. 8

FIG. 8 is a flowchart of an illustrative process 800 for managing transactions in a system including a service provider subsystem and a funding subsystem. At operation 802 of process 800, the funding subsystem may receive from the service provider subsystem authorization data indicative of a service transaction identifier of a service transaction facilitated by the service provider subsystem and a service transaction value amount of the service transaction (e.g., as described at least with respect to operation 506 of process 500). At operation 804 of process 800, the funding subsystem may communicate to the service provider subsystem a customer receipt request including the service transaction identifier indicated by the authorization data and authentication data indicative of an active session between the funding subsystem and an authenticated customer of the funding subsystem (e.g., as described at least with respect to operation 522 of process 500). At operation 806 of process 800, the funding subsystem may receive from the service provider subsystem a customer receipt indicative of a service transaction descriptor of the service transaction (e.g., as described at least with respect to operation 528 of process 500). At operation 808 of process 800, the funding subsystem may present the customer receipt to the authenticated customer during the active session (e.g., as described at least with respect to operations 532 and 534 of process 500).

It is understood that the operations shown in process 800 of FIG. 8 are only illustrative and that existing operations may be modified or omitted, additional operations may be added, and the order of certain operations may be altered.

Further Description of FIGS. 1-8

One, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device or subsystem to another electronic device or subsystem using any suitable communications protocol (e.g., the computer-readable medium may be communicated to electronic device 100 via communications circuitry 114 (e.g., as at least a portion of an application 103 and/or as at least a portion of an application 103a)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 103a)). Any or all of the modules or other components of system 1 may be mounted on an expansion card, mounted directly on a system motherboard, or integrated into a system chipset component (e.g., into a "north bridge" chip).

Any or each module or component of system 1 may be a dedicated system implemented using one or more expansion cards adapted for various bus standards. For example, all of the modules may be mounted on different interconnected expansion cards or all of the modules may be mounted on one expansion card. Any or each module or component of system 1 may include its own processing circuitry and/or memory. Alternatively, any or each module or component of system 1 may share processing circuitry and/or memory with any other module.

As described above, one aspect of the present technology is the gathering and use of data available from various sources to detail secure service provider transactions. The present disclosure contemplates that in some instances, this gathered data may include personal information data that uniquely identifies or can be used to contact or locate a specific person. Such personal information data can include demographic data, location-based data, telephone numbers, email addresses, social network identifiers, home addresses, office addresses, data or records relating to a user's health or level of fitness (e.g., vital signs measurements, medication information, exercise information, etc.) or purchase history, date of birth, or any other identifying or personal information.

The present disclosure recognizes that the use of such personal information data, in the present technology, can be used to the benefit of users. The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location detection services, the present technology can be configured to allow users to select to "opt in" or "opt out" of participation in the collection of personal information data during registration for services or anytime thereafter. In addition to providing "opt in" or "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, detailing secure service provider transactions can be made based on non-personal information data or a bare minimum amount of personal information, such as the content being requested by the device associated with a user, other non-personal information available to the device, or publicly available information.

While there have been described systems, methods, and computer-readable media for detailing secure service provider transactions, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A computer-implemented method, comprising:
   receiving, by a credential manager subsystem device and from a client device, user authentication data for logging the client device into the credential manager subsystem device and client device data identifying a type of the client device;
   establishing, by the credential manager subsystem device, an active session with the client device upon authenticating the user authentication data;
   transmitting, by the credential manager subsystem device, first transaction information corresponding to a service transaction to the client device, the first transaction information identifying an aggregated value associated with the service transaction;
   receiving, by the credential manager subsystem device and from the client device, transaction selection data corresponding to the service transaction; and
   during the active session:
      communicating, by the credential manager subsystem device and to a remote service provider subsystem device, a customer receipt request including the client device data;
      populating, by the service provider subsystem device, a web container with an image file comprising second transaction information that visually identifies a plurality of values corresponding to at least two transactions of a plurality of transactions that comprise the service transaction, a resolution of the image file being determined by the client device data, and the image file being configured to be inaccessible to the credential manager subsystem device;
      transmitting, by the service provider subsystem device, a web location identifier associated with the web container of the remote service provider subsystem device;
      receiving, at the credential manager subsystem device and from the remote service provider subsystem device, the web location identifier associated with the web container of the remote service provider subsystem device;
      transmitting, by the credential manager subsystem device and to the client device, the web location identifier associated with the web container of the remote service provider subsystem device; and
      displaying, by the client device, the image file comprising second transaction information as an overlay, at the resolution, over the first information in a user interface of the client device.

2. The computer-implemented method of claim 1, wherein the web container is further configured to store second transaction information indicative of a service transaction descriptor that is different form the first transaction information, and wherein the service transaction descriptor comprises at least one of:
  a description of a service provider product associated with the service transaction; or
  a time associated with the service transaction.

3. The computer-implemented method of claim 1, wherein the second transaction information is further indicative of a service transaction value amount of the service transaction.

4. The computer-implemented method of claim 1, further comprising providing, by the credential manager subsystem device, the second transaction information to the client device.

5. The computer-implemented method of claim 4, further comprising deleting the second transaction information from the credential manager subsystem device after the providing.

6. The computer-implemented method of claim 1, wherein the second transaction information is a sum of at least two service transactions.

7. The computer-implemented method of claim 1, wherein the customer receipt request comprises an aggregated transaction identifier and the user authentication data.

8. The computer-implemented method of claim 7, further comprising authenticating the user authentication data.

9. The computer-implemented method of claim 7, wherein the user authentication data is indicative of a shared secret between the remote service provider subsystem device and the credential manager subsystem device.

10. The computer-implemented method of claim 7, wherein:
  the user authentication data is indicative of a type of the client device that initiated the customer receipt request at the credential manager subsystem device; and
  the second transaction information comprises an image in a format based at least in part on the type of the client device indicated by the user authentication data.

11. The computer-implemented method of claim 7, wherein the user authentication data is indicative of a technique used by the credential manager subsystem device to authenticate a customer of the credential manager subsystem device that initiated the customer receipt request at the credential manager subsystem device.

12. The computer-implemented method of claim 7, wherein the user authentication data is indicative of a time at which the credential manager subsystem device authenticated a customer of the credential manager subsystem device that initiated the customer receipt request.

13. A non-transitory computer-readable medium, storing computer-executable instructions that, when executed by one or more processors of a credential manager subsystem device, configure the one or more processors to perform operations comprising:
  receiving, from a client device, user authentication data for logging the client device into the credential manager subsystem device and client device data identifying a type of the client device;
  establishing an active session with the client device upon authenticating the user authentication data;
  transmitting first transaction information corresponding to a service transaction to the client device, the first transaction information identifying an aggregated value associated with the service transaction;
  receiving, from the client device, transaction selection data corresponding to the service transaction; and
  during the active session:
    communicating, to a remote service provider subsystem device, a customer receipt request including the client device data;
    generating a web container to be populated, by the service provider subsystem device, with an image file comprising second transaction information that visually identifies a plurality of values corresponding to at least two transactions of a plurality of transactions that comprise the service transaction, a resolution of the image file being determined by the client device data, and the image file being configured to be inaccessible to the credential manager subsystem device;
    receiving, from the remote service provider subsystem device, a web location identifier associated with a web container of the remote service provider subsystem device; and
    transmitting, to the client device, the web location identifier associated with the web container of the remote service provider subsystem device to the client device for display of the image file comprising second transaction information as an overlay, at the resolution, over the first transaction information in a user interface of the client device.

14. The non-transitory computer-readable medium of claim 13, wherein the web container is further configured to store second transaction information indicative of a service transaction descriptor that is different form the first transaction information, and wherein the service transaction descriptor comprises at least one of:
  a description of a service provider product associated with the service transaction; or
  a time associated with the service transaction.

15. The non-transitory computer-readable medium of claim 13, wherein the second transaction information is further indicative of a service transaction value amount of the service transaction.

16. The non-transitory computer-readable medium of claim 13, wherein the operations further comprise providing the second transaction information to the client device.

17. The non-transitory computer-readable medium of claim 16, further comprising deleting the second transaction information from the credential manager subsystem device after the providing.

18. A credential manager subsystem device, comprising:
  memory configured to store computer-executable instructions; and
  one or more processors configured to access the memory and execute the computer-executable instructions to at least:
    receive, from a client device, user authentication data for logging the client device into the credential manager subsystem device and client device data identifying a type of the client device;
    establish an active session with the client device upon authenticating the user authentication data;
    transmit first transaction information corresponding to a service transaction to the client device, the first transaction information identifying an aggregated value associated with the service transaction;
    receive, from the client device, transaction selection data corresponding to the service transaction; and
  during the active session:
    communicate, to a remote service provider subsystem device, a customer receipt request including the client device data;

generating a web container to be populated, by the service provider subsystem device, with an image file comprising second transaction information that visually identifies a plurality of values corresponding to at least two transactions of a plurality of transactions that comprise the service transaction, a resolution of the image file being determined by the client device data, and the image file being configured to be inaccessible to the credential manager subsystem device;

receive, from the remote service provider subsystem device, a web location identifier associated with a web container of the remote service provider subsystem device; and transmit, to the client device, the web location identifier associated with the web container of the remote service provider subsystem device to the client device for display of the image file comprising second transaction information as an overlay, at the resolution, over the first transaction information in a user interface of the client device.

19. The credential manager subsystem device of claim 18, wherein the web container is further configured to store second transaction information indicative of a service transaction descriptor that is different form the first transaction information, and wherein the service transaction descriptor comprises at least one of:

a description of a service provider product associated with the service transaction; or a time associated with the service transaction.

20. The credential manager subsystem device of claim 18, wherein the computer-executable instructions are further executed to at least:

provide the second transaction information to the client device; and delete the second transaction information from the credential manager subsystem device after the providing.

\* \* \* \* \*

UNITED STATES PATENT AND TRADEMARK OFFICE
CERTIFICATE OF CORRECTION

| | | |
|---|---|---|
| PATENT NO. | : 12,182,810 B2 | Page 1 of 1 |
| APPLICATION NO. | : 17/848114 | |
| DATED | : December 31, 2024 | |
| INVENTOR(S) | : Chunlai Ma et al. | |

It is certified that error appears in the above-identified patent and that said Letters Patent is hereby corrected as shown below:

In the Claims

In Column 45, Line 2: In Claim 2, please delete "different form" and insert --different from--.

In Column 46, Line 29: In Claim 14, please delete "different form" and insert --different from--.

In Column 48, Line 6: In Claim 19, please delete "different form" and insert --different from--.

Signed and Sealed this
Eleventh Day of February, 2025

Coke Morgan Stewart
*Acting Director of the United States Patent and Trademark Office*